US007236618B1

(12) United States Patent
Chui et al.

(10) Patent No.: US 7,236,618 B1
(45) Date of Patent: Jun. 26, 2007

(54) VIRTUAL SURGERY SYSTEM WITH FORCE FEEDBACK

(76) Inventors: Chee-Kong Chui, Blk 325 Yishun Central #12-373, Singapore (SG) 760325; Hua Wei, Blk 4 Normanton Park Road, #11-109K, Normanton Park, Singapore (SG) 119000; Yaoping Wang, Blk 3 Normanton Park Road #03-175, Normanton Park, Singapore (SG) 119000; Wieslaw L. Nowinski, 111 Clementi Road #10-06 NUS Kent Vale, Blk C, Singapore (SG) 129792

( * ) Notice: Subject to any disclaimer, the term of this patent is extended or adjusted under 35 U.S.C. 154(b) by 777 days.

(21) Appl. No.: 10/332,429

(22) PCT Filed: Jul. 7, 2000

(86) PCT No.: PCT/SG00/00101

§ 371 (c)(1),
(2), (4) Date: Sep. 17, 2003

(87) PCT Pub. No.: WO02/05217

PCT Pub. Date: Jan. 17, 2002

(51) Int. Cl.
*G06K 9/00* (2006.01)
(52) U.S. Cl. ...................... 382/128; 434/262
(58) Field of Classification Search ............... 382/128, 382/129, 130, 131, 133–134; 434/262, 263, 434/265, 267, 270–273; 345/156, 419; 600/27, 600/417, 429, 558; 128/859, 887, 206.19
See application file for complete search history.

(56) References Cited

U.S. PATENT DOCUMENTS 5,802,353 A    9/1998   Avila et al. .................. 395/500
5,882,206 A *  3/1999   Gillio ......................... 434/262
5,952,796 A    9/1999   Colgate et al. ................ 318/1

(Continued)

OTHER PUBLICATIONS

Fleute, M. et al., "Building a Complete Surface Model from Sparse Data Using Statistical Shape Models: Application to Computer Assisted Knee Surgery," in *Proceedings of the Medical Image Computing and Computer-Assisted Intervention, MICCAI Int'l Conference*, Oct. 1998, pp. 879-883, 886-887.

(Continued)

*Primary Examiner*—Jingge Wu
*Assistant Examiner*—Abolfazl Tabatabai
(74) *Attorney, Agent, or Firm*—Seed IP Law Group PLLC

(57) ABSTRACT

In one aspect, the present invention provides a method of interacting with simulated three-dimensional objects, the method including the steps of the identification of three-dimensional objects from volume images; the association of physical properties with identified objects said properties including at least visual and haptic properties of the identified objects; and incorporating said identified objects and associated physical properties into a system including at least one visual interface device and at least one haptic interface device thus enabling the system to simulate visual and haptic properties of the identified objects, or any part thereof, to a human user interacting with the simulated three-dimensional objects, or any part thereof, said interaction including the generation of signals by the system for transmission to the at least one visual interface device in accordance with the physical properties associated with the objects and the reception of signals from the least one haptic interface device in accordance with user requests.

44 Claims, 14 Drawing Sheets

U.S. PATENT DOCUMENTS 6,083,163 A * 7/2000 Wegner et al. ............... 600/429
6,529,183 B1 * 3/2003 MacLean et al. ........... 345/156
6,650,338 B1 * 11/2003 Kolarov et al. ............. 345/619
6,705,871 B1 * 3/2004 Bevirt et al. ................. 434/262

OTHER PUBLICATIONS

Rosen, J. et al., "Evaluation of Virtual Reality," *IEEE Engineering in Medicine and Biology Magazine* 15(2): 16-22, Mar./Apr. 1996.

* cited by examiner

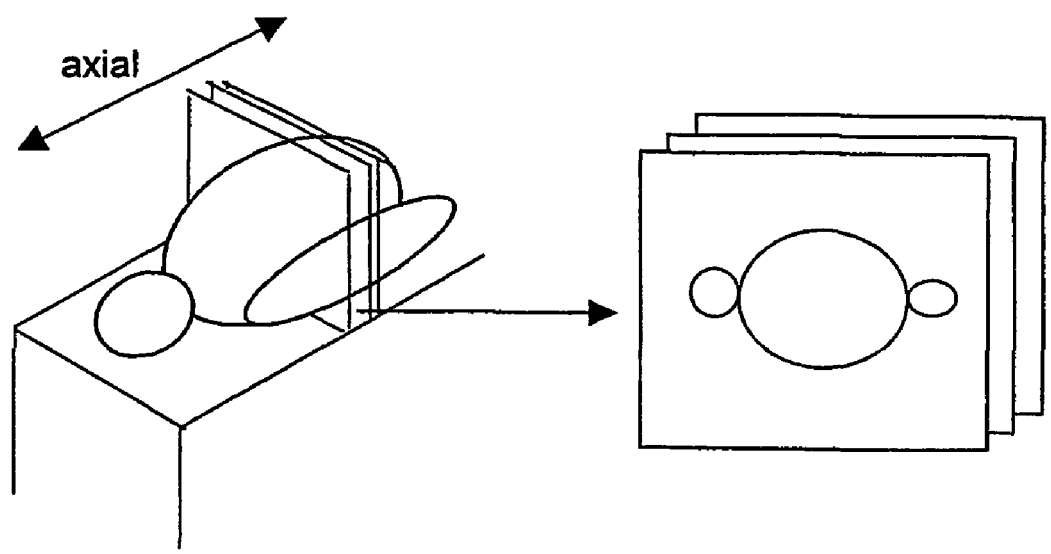
Figure 5
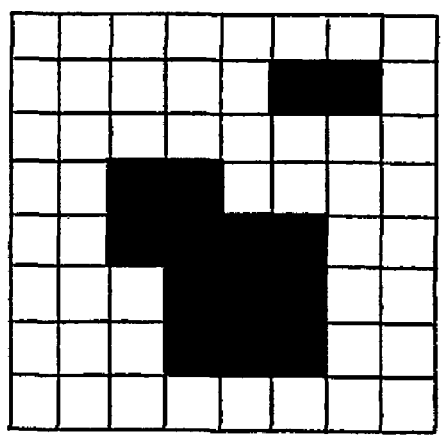
Figure 6a
Figure 6b

VIRTUAL SURGERY SYSTEM WITH FORCE FEEDBACK

FIELD OF THE INVENTION

The invention relates to a novel means and method of extracting and editing three-dimensional objects from volume images utilising multimedia interfaces. The means and method is particularly suited to the extraction of objects from volume images produced by Magnetic Resonance Imaging (MRI), Computed Tomography (CT) or ultrasound equipment.

BACKGROUND OF THE INVENTION

The extraction of three-dimensional images from volume data consisting of a stack of two-dimensional images is attracting significant attention in light of the general recognition of the likely impact that computer integrated surgical systems and technology will have in the future.

Computer assisted surgical planning and computer assisted surgical execution systems accurately perform optimised patient specific treatment plans. The input data to these types of systems are volume data usually obtained from tomographic imaging techniques. The objects and structures embedded in the volume data represent physical structures. In many instances, the medical practitioner is required to feel the patient in the diagnosis process.

An example where systems are used for the extraction and editing of three-dimensional objects from volume images is interventional angiography which has generated significant research and development on the three-dimensional reconstruction of arterial vessels from planar radiology obtained at several angles around the subject. In order to obtain a three-dimensional reconstruction from a C-arm mounted XRII traditionally the trajectory of the source and detectors system is characterized and the pixel size is computed. Various methods have been proposed in the past to compute different sets of characterization parameters.

Different approaches have also been proposed for vascular shape segmentation and structure extraction using mathematical morphology, region growing schemes and shape features in addition to greyscale information. In one particular method to extract a three-dimensional structure of blood vessels in the lung region from chest X-ray CT images, the proposal includes a recursive search method of the cross section of tree structure objects. The reconstruction of a three-dimensional volume of the vessel structure has been demonstrated in less than 10 minutes after the acquisition of a rotational image. In this particular instance, the volume rendered three-dimensional image offers high quality views compared with results of other three-dimensional imaging modalities when applied to high contrast vessel data.

In previous studies, an interactive vessel tracing method has been used to obtain a cerebral model. As volume data sets often lack the resolution to allow automatic network segmentation for blood vessels, this approach provides a free-form curve drawing technique by which human perception is quantitatively passed to the computer, using a "reach-in" environment as provided by a "Virtual Workbench". The "Virtual Workbench" is a virtual reality workstation that provides three-dimensional viewing by use of stereoscopic glasses and time split displays rendered using a computer graphics workstation.

This precise and dexterous environment transforms perception to allow the relatively easy identification of vessels. The tools exploit the reach-in hand-immersion abilities of the Virtual Workbench and allow sustained productive work and the generation of three dimensional texture sub-volumes to allow interactive vessel tracing in real-time. A set of magnetic resonance angiograph (MRA) data of the human brain is used for this purpose and a total of 251 segments of the cerebral vessels have been identified and registered based on the connection with the primary vasculature of the Visible Human male Data (VHD). The VHD represents the effort of the National Institute of Health in the United States to produce a complete, anatomically detailed three-dimensional representation of normal male, and female bodies.

Generally, the traditional Human Computer Interaction (HCI) methodology is considered to be cumbersome. For many intricate or complex functions there are too many buttons to be depressed on the keyboard mouse or other interfacing devices. These interfaces are not natural for human interaction particularly in the field of medical applications: since surgeons do not have the ability to use their hands to operate a computer and often communicate with their assistants even in the process of changing tools.

For many applications there is a need for an improved human machine interface that is better suited to the needs of humans and in particular for tasks such at those performed by surgeons.

The above discussion of documents, acts, materials, devices, articles or the like is included in this specification; solely for the purpose of providing a context for the present invention. It is not suggested or represented that any or all of these matters formed part of the prior art base or were common general knowledge in the field relevant to the present invention as it existed before the priority date of each claim of this application.

SUMMARY OF INVENTION

In a first aspect, the present invention provides a method of interacting with simulated three-dimensional objects, the method including the steps of the identification of three-dimensional objects from volume images;

the association of physical properties with identified objects said properties including at least visual and haptic properties of the identified objects;

incorporating said identified objects and associated physical properties into a system including at least one visual interface device and at least one haptic interface device thus, enabling the system to simulate visual and haptic properties of the identified objects, or any part thereof, to a human user interacting with the simulated three-dimensional objects, or any part thereof, said interaction including the generation of signals by the system for transmission to the at least one visual interface device in accordance with the physical properties associated with the objects and the reception of signals from the least one haptic interface device in accordance with user requests; and editing the representation of a simulated object in order to refine the representation of the simulated object derived from volume images.

Preferably, during interaction between the human user and the simulated objects ancillary visual information is presented to the user.

It is preferable when the method includes the association of audible properties with identified objects, or parts thereof, and the system includes at least one audio interface device.

With the inclusion of an audio interface device, during interaction between the human user and the simulated objects, ancillary audio information is presented to the user.

It is preferable that at least one haptic interface device includes the facility to receive signals from the system said signals being in accordance with the associated haptic properties of the simulated objects, or any part thereof, that the user interacts with.

Preferably, the interaction between the various interface devices of the system is co-ordinated such that the correct registration of physical properties with the identified objects is maintained for the various interfaces during interaction between the simulated objects and the human user.

It is preferred that the step of editing the representation of a simulated object includes the use of the at least one haptic and at least one visual interface device by the user.

Preferably, the step of editing the representation of a simulated object includes the use of at least one audio interface device by the user.

It is preferable that a discrete model of identified objects is derived from volume images.

In a preferred embodiment, the method includes the step of editing the representation of a simulated object in order to refine the representation of the object derived from volume images, the method also including the application of an interpolative scheme to produce a continuous model from the discrete model derived from volume images. Preferably the step of editing the representation of a simulated object includes the use of the at least one haptic and at least one visual interface device by the user. It is also preferable that the step of editing the representation of a simulated object includes the use of at least one audio interface device by the user.

Preferably, the method includes an iterative process whereby an edited version of an object is compared with a previous discrete model of the object to determine the difference between the edited version and the previous discrete model of the object and whether the difference is within an acceptable limit, with the edited version being converted into a discrete model for the purpose determining the difference with the previous discrete model.

In another aspect, the present invention also provides a system for interacting with simulated three-dimensional objects, the system including representations of three-dimensional objects identified from volume images, said representations including physical properties associated with each of the objects relating to at least visual and haptic properties thereof;

at least one visual interface device and at least one haptic interface device enabling a user to interact with a simulated three-dimensional object said interaction including the generation of signals by the system for transmission to the at least one visual interface device in accordance with the visual properties associated with the objects and the reception of signals from the at least one haptic interface device in accordance with user requests; and a voice recognition facility capable of receiving and interpreting the spoken requests of a user thus enabling the user to issue commands to the system without necessitating the use of one or both of the user's hands.

Preferably, the system includes the provision of ancillary visual information to a user.

It is also preferred that the physical properties associated with each of the objects, or any part thereof, includes audible properties and the system also includes at least one audio interface device and the generation of signals by the system for transmission to the at least one audio interface device in accordance with the audio properties associated with the objects, or any part thereof. Preferably, the system includes the provision of ancillary audio information to a user.

It is preferable that the haptic interface device is capable of receiving signals from the system corresponding to the associated flaptic properties for any simulated object, or part thereof, said signals conveying a haptic sensation to the user as a result of interacting with the object.

It is also preferred that the system includes the capability to co-ordinate the interaction between the various interface devices such that the correct registration of physical properties with the identified objects is maintained for the various system interfaces during interaction between the simulated objects and the human user.

In yet another aspect, the present invention provides a method of interacting with simulated three-dimensional objects, the method including the steps of the identification of three-dimensional objects from volume images;

the development of a model to represent those objects;

the association of physical properties with identified objects in the developed model said properties including at least visual and haptic properties of the identified objects;

the association of physical properties with identified objects in the developed model said properties including at least visual and haptic properties of the identified objects; and incorporating said model and associated physical properties into a system including at least one visual interface device and at least one haptic interface device thus enabling the system to simulate visual and haptic properties of the identified objects or any part thereof, to a human user interacting with the simulated three-dimensional objects, or any part thereof, said interaction including the generation of signals by the system for transmission to the at least one visual interface device in accordance with the physical properties associated with the objects and the reception of signals from the at least one haptic interface device in accordance with user requests; and the interaction between the various interface devices of the system being coordinated such that the correct registration of physical properties with the developed model is maintained for the various interfaces during interaction between the simulated objects and the human user.

Preferably, during interaction between the human user and the simulated objects, or any part thereof, ancillary visual information is presented to the user.

It is preferred that the method includes the association of audible properties with identified objects, or parts thereof, in the model, and the system includes at least one audio interface device. Preferably, during interaction between the human user and simulated objects, or parts thereof, ancillary audio information is presented to the user.

Preferably at least one haptic interface device includes the facility to receive signals from the system said signals being in accordance with the associated haptic properties of the simulated objects, or any part thereof, that the user interacts with.

It is preferred that the method includes the step of editing the model of a simulated object in order to refine the model of the simulated object derived from volume images.

It is preferred that the step of editing the model of a simulated object includes the use of the at least one haptic and at least one visual interface device by the user.

Preferably, the step of editing the model of a simulated object includes the use of the at least one audio interface device by the user.

It is preferred that the model of identified objects derived from volume images is a discrete model.

In yet another aspect, the present invention provides a method including the step of editing the model of a simulated object in order to refine the model of the simulated object derived from the volume images, the method also including the application of an interpolative scheme to produce a continuous model from the discrete model derived from volume images.

Preferably, the step of editing the representation of a simulated object includes the use of the at least one haptic and at least one visual interface device by the user.

It is preferable that the step of editing the representation of a simulated object includes the use of at least one audio interface device by the user.

In a particularly preferred embodiment, the method including an iterative process whereby an edited version of a model is compared with a previous discrete model of the object to determine the difference between the edited version and the previous discrete model of the object and whether the difference is within an acceptable limit, said edited version being converted into a discrete model for the purpose determining the difference with the previous discrete model.

Preferably the model is a potential field model representation of identified objects.

It is preferable that the potential field model includes a physically oriented data structure for the representation of objects derived from volume images and the association of physical properties therewith.

In yet another aspect, the present invention provides a system for interacting with simulated three dimensional objects, the system including a model of three-dimensional objects identified from volume images, said model including physical properties associated with each of the objects relating to at least visual and haptic properties, thereof;

at least one visual and haptic interface device enabling a user to interact with a simulated three-dimensional object said interaction including the generation of signals by the system for transmission to at least the at least one visual interface device in accordance with the visual properties associated with the objects and the reception of signals from the at least one haptic interface device in accordance with user requests; and a voice recognition facility capable of receiving and interpreting the spoken requests of a user thus enabling the user to issue commands to the system without necessitating the use of one or both of the user's hands.

Preferably, the system includes the provision of ancillary visual information to a user.

Preferably, the physical properties associated with each of the objects, or any part thereof, includes audible properties and the system also includes at least one audio interface device and the generation of signals by the system for transmission to the at least one audio interface device in accordance with the audio properties associated with the objects, or any part thereof.

It is preferred that the system includes the provision of ancillary audio information to a user.

It is preferable that the haptic interface device is capable of receiving signals from the system corresponding to the associated haptic properties for any simulated object, or part thereof, said signals conveying a haptic sensation to the user as a result of interacting with the object.

Preferably, the system includes the capability to coordinate the interaction between the various interface devices such that the correct registration of physical properties with the model is maintained for the various interfaces during interaction between the simulated objects and the human user.

Preferably, the model is a potential field model representation of identified objects.

It is preferred that the potential field model includes a physically oriented data structure for the representation of objects derived from volume images and the association of physical properties therewith.

Preferably, the potential field is defined as a volume of force vectors that have a tendency of moving from values of high to low potential.

It is preferred that the potential field model provides the basis for the establishment of force relationships and audio signal association for the generation of sensory feedback.

DESCRIPTION OF THE PREFERRED EMBODIMENT

The present invention will now be described in relation to a preferred embodiment.

In particular, a preferred embodiment of the present invention relating to the specific field of medical imaging and subsequent extraction and editing of the vascular system of a patient will be described to highlight the best method of performing the invention known to the applicant. However, it is to be appreciated that the following description is not to limit the generality of the above description. The description of the preferred embodiment relates to an Incremental Object Extraction and Editing System (IOEES) and refers to the accompanying drawings in which:

FIG. 5 illustrates a stack of two dimensional images as obtained from a scan of a patient;

FIGS. 6a and 6b illustrate a simple transformation function used in the development of a potential field model;

Figure 1:
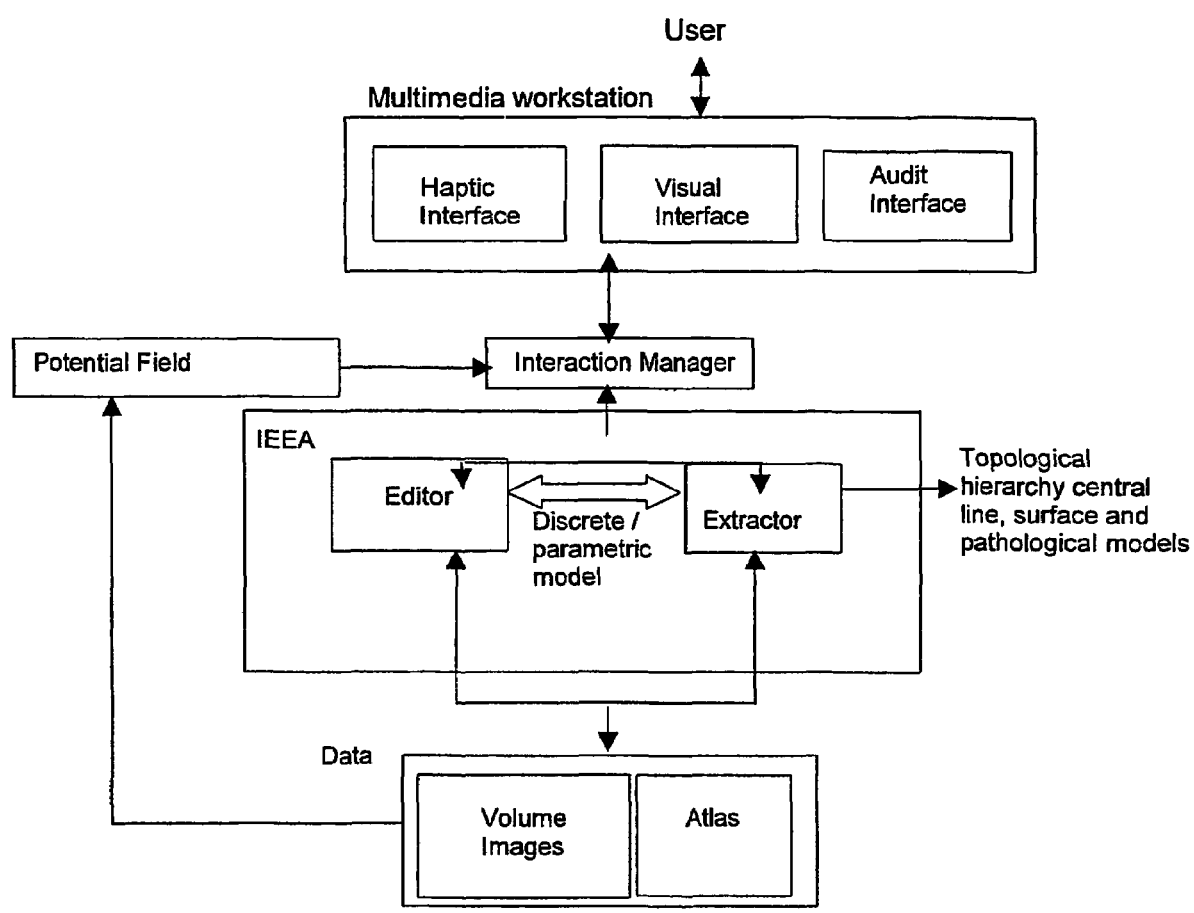
FIG. 1 illustrates a highly abstracted architectural representation of the IOEES.

FIG. 1 illustrates an architectural representation of the IOEES depicting visual, audio and haptic interfaces as part of a multimedia workstation that is serving the user. The registration and coordination of these interfaces is controlled by the Interaction Manager. The Interaction Manager interacts with the Editor and Extractor modules to provide a continuous flow of haptic, visual and audio feedback to the user during the object extraction and editing processes. The main source of data used in this system is sets of volume images. However, 2D and 3D atlas or other geometric or physical data could be used to enhance the extraction and editing processes.

Figure 2:
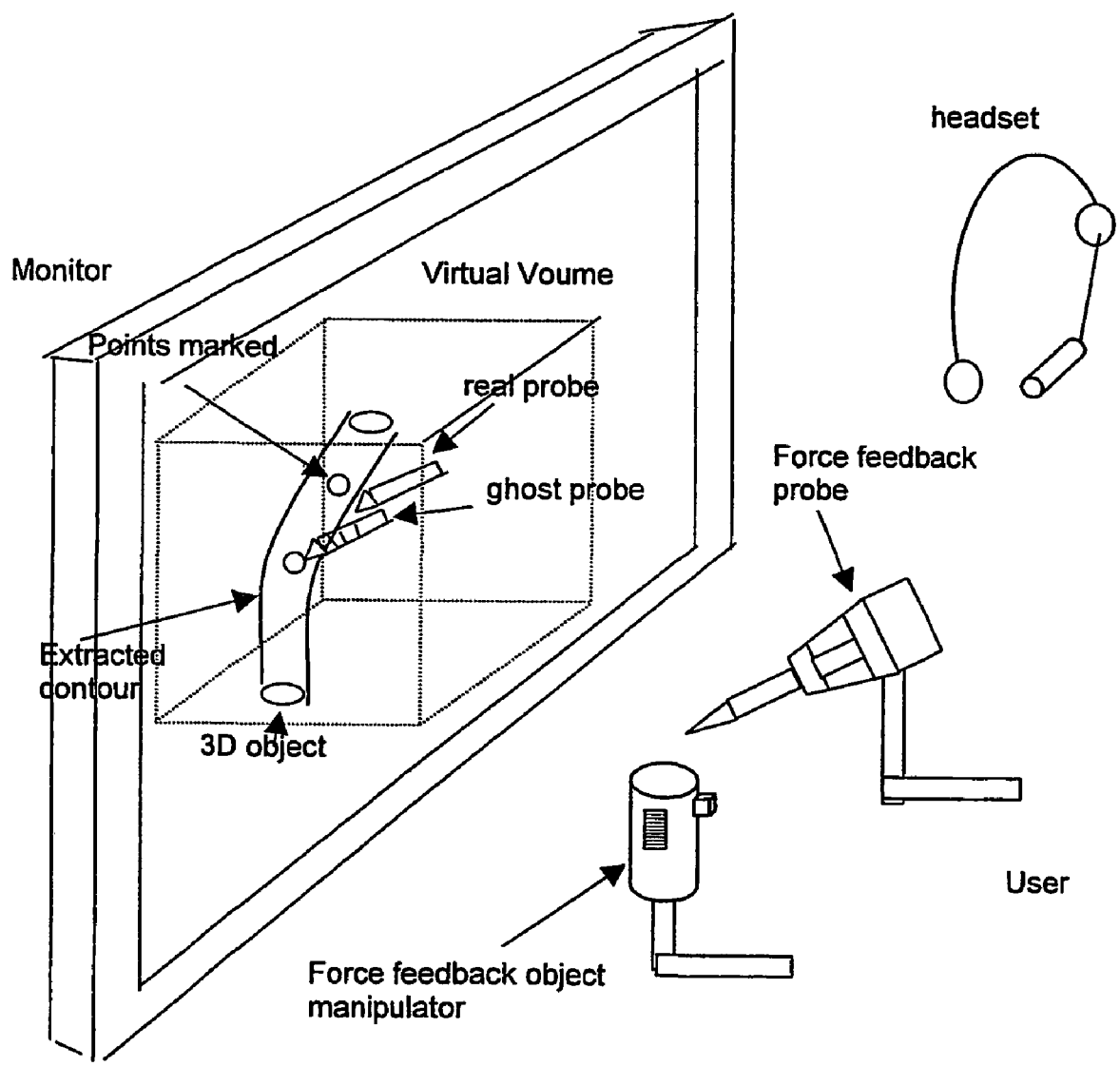
FIG. 2 shows a representative implementation of an IOEES.

FIG. 2 shows an implementation of IOEES where the user wears a headset and holds a pair of haptic tools, in this instance a force feedback probe and an object manipulator. The computer system displays a rendered volume in plain or stereo 3D.

Figure 3:
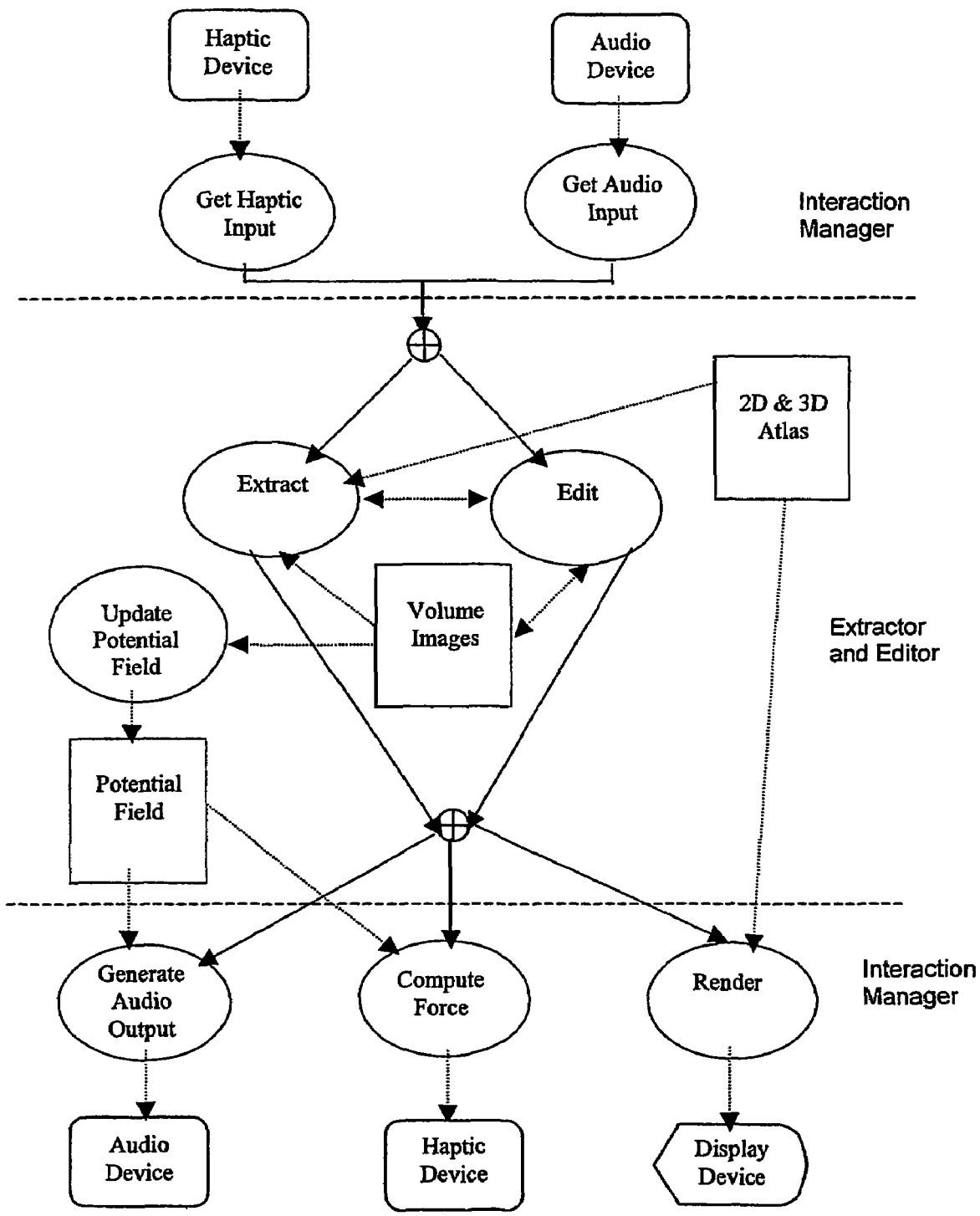
FIG. 3 represents an overview of the basic components involved during the implementation of the method of IOEES.

FIG. 3 is an overview of the method used in this IOEES. The system polls data inputs from both haptic and audio means. These inputs will generally represent the volume object being edited or a selected region of an object being extracted. The inputs may initiate responses from the computer to the user through the visual, haptic or audio means.

Figure 4A:
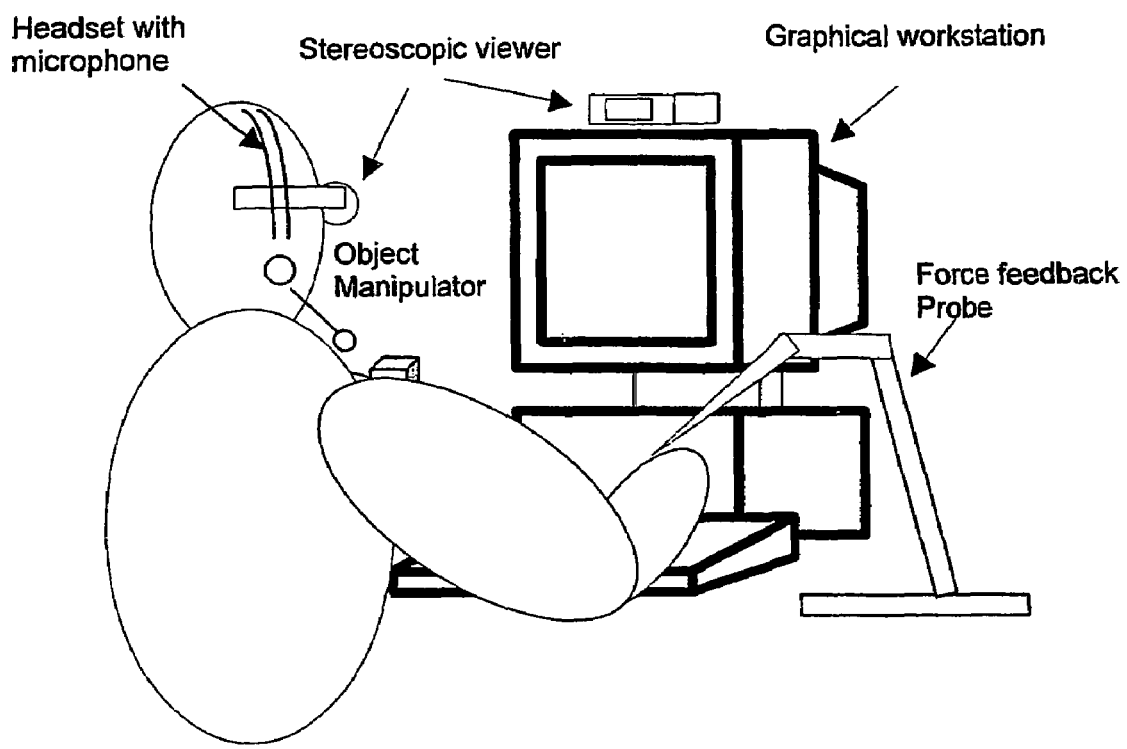
FIGS. 4a and 4b show diagrammatic representations of a suggested implementation of an IOEES where a user is seated at a workstation with various interface device available to them for interacting with simulated three-dimensional objects.
Figure 4B:
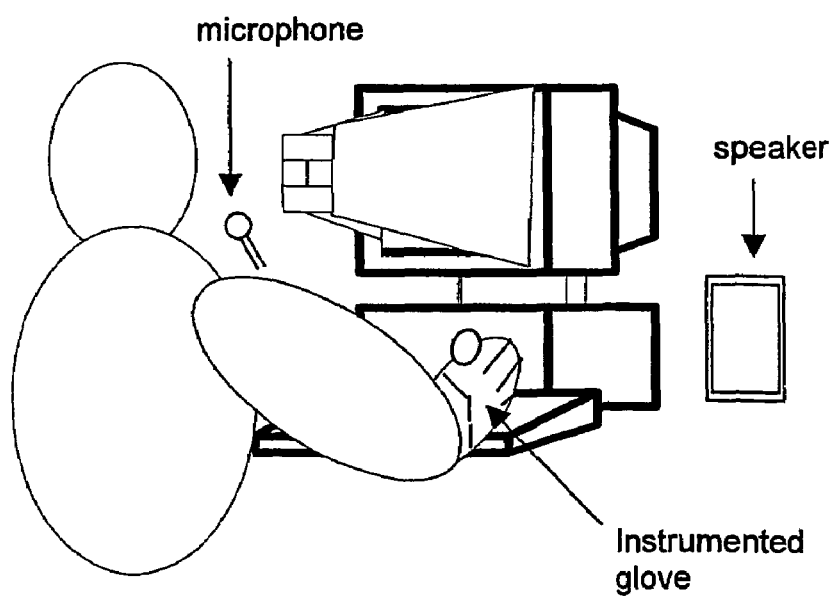

FIGS. 4a and 4b show diagrammatic representations a suggested implementation of an IOEES workstation. The workstation in an IOEES includes a computer system that has sufficient graphic capabilities to render a set of volumetric images in plain or stereo 3D.

The workstation in FIG. 4a also includes a 3D-interaction tool with force feedback, referred to as a force feedback probe, that enables a user to pick and move a point or an object in the 3D space of the set of volumetric images displayed on the computer monitor. FIG. 4a also includes a hand held device, referred to as an object manipulator that enables a user to perform zooming, 3D rotation and translation of the volumetric object in the virtual space. The workstation also includes a speaker and a microphone, possibly in the form of headset to provide audio interaction between user and the computer.

An alternative workstation configuration is depicted in FIG. 4b where the workstation replaces the force feedback probe of FIG. 4a with a pair of instrumented gloves. FIG. 4b also depicts a workstation that includes a holoscope in place of the stereo emitter and glasses, and the headset with a more conventional microphone and speaker arrangement.

Volume Images and Potential Field Model

Volume images are generally provided in the form of a stack of two-dimensional images in the axial direction of an object that is to be considered. A diagrammatic representation is shown in FIG. 5 where a stack of images are generated correlating with two dimensional slices taken generally along the longitudinal axis of a patient.

Volumetric images serve as the source of input to the method of the present invention. Virtually any scanner can produce suitable axial images, or can at least produce images that can easily be converted to axial images.

For example, rotational CT scanners capture patient data in the form of projection images. From these images a method known as Back Projection technique can be used to construct volume images.

Volume rendering techniques such as ray casting and projection techniques have traditionally been used in the visualization of volume images. Advances in computer hardware and software have greatly improved the speed and accuracy of such visualization.

In a preferred embodiment of the invention, a potential field model is used as the data source for force computation and audio generation. The potential field is defined as a volume of force vectors.

For example, the input to the process for creating a potential field model could be the output of two-dimensional images from a CTA scanner. In this instance, the data will contain both vascular and bone structures and to differentiate between these two types of structure, the process includes an analysis of the intensity of the pixels forming the two-dimensional images. This enables the derivation of outlines in the two-dimensional images corresponding to the vascular and bone structures. When considering a volume of images, the different structures are determined by an analysis of the intensity of each voxel forming the volume image.

For each plane of the volume images, the method preferably first derives force vectors for that plane, the force vectors on each plane being independent of the other planes in the volume. A collection of planes of force vectors contributes to the establishment of a potential field. The construction of a potential field from volume data is illustrated in FIGS. 6a and 6b.

For illustration purposes, it is appropriate to consider a plane of black and white pixels having a dimension 8×8 as detailed in FIG. 6a. A relatively straightforward transformation function may be used to associate a black pixel with a value of 1, a white pixel that is not bordering any black pixel with a value of 0, a white pixel that is bordering a black pixel with a vector of magnitude 0.5 and direction given in FIG. 6b, and a value of 0.5 in an ambiguous case.

Of course, it is possible to have more complex schemes that involve the physical properties of the objects in the volume, and operate on pixels with a wider range of colours.

The force vectors resulting from this step of the method is referred to as a potential field since the force vectors define the tendency of moving from values of low to high potential similar to an electrostatic potential field.

Figure 7:
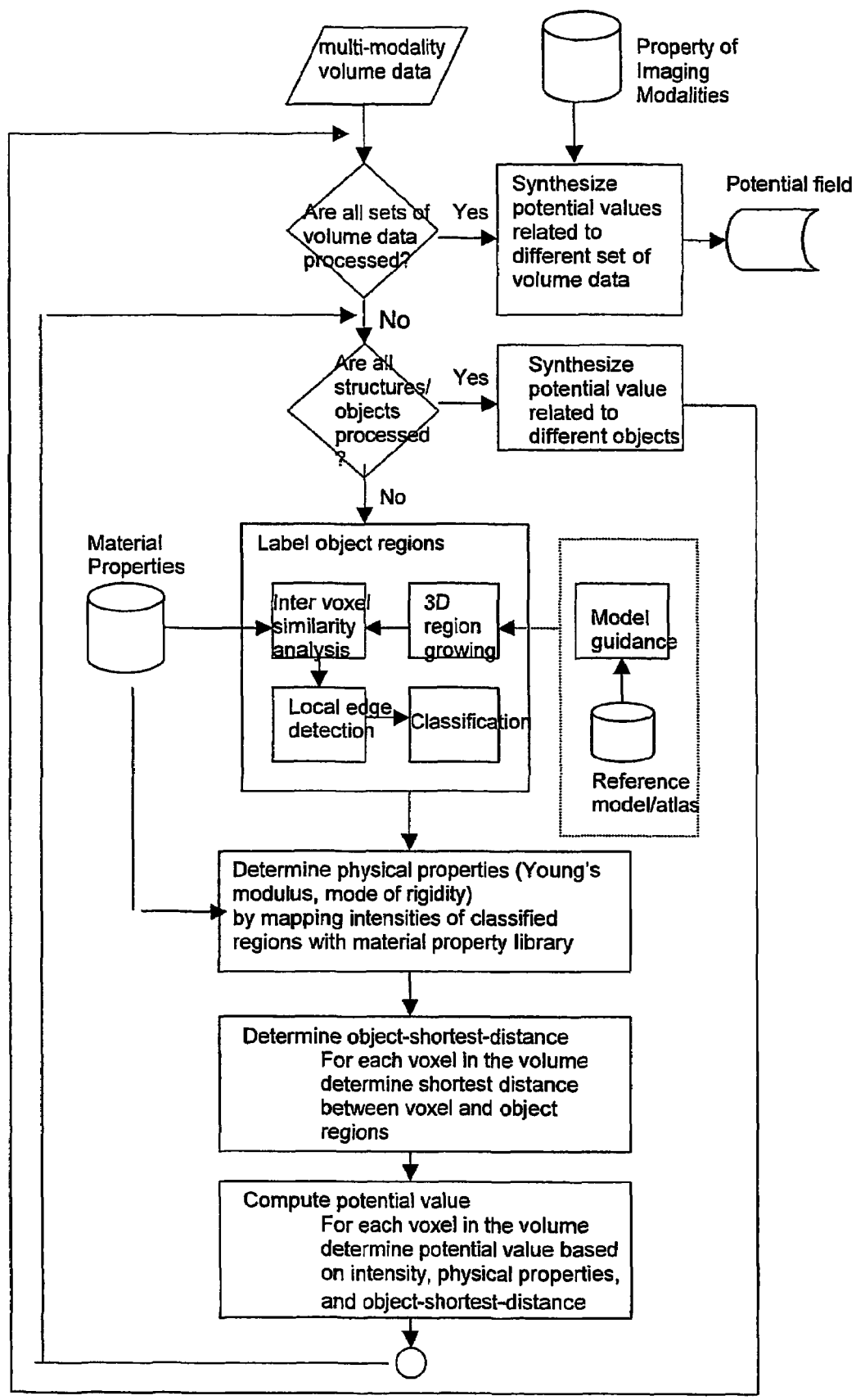
FIG. 7 illustrates the creation process of a potential field.

FIG. 7 provides a more detailed illustration of a preferred process of creating a potential field model. The input to the creation process is multi-modality volume data, which refers to data that consists of one or more groups of volume data with different imaging modalities. This is likely as a patient may be subjected to MRA scanning in addition to CT scanning.

In order to use more than one set of volume data an added process of synthesising the potential value of each set of volume data is required to derive a single potential field. The library identified as "Property of Imaging Modalities" used in this synthesis process stores parameters for equalising different modalities.

A voxel is the smallest unit cube of a volume and an inter-voxel similarity comparison is used to determine whether a voxel belongs to a particular object. Local edge detection determines the boundary area of the regions and the classification process labels the object regions.

For each structure or object embedded in the volume data, the regions containing the object are labeled based upon information including the image intensity, the intensity gradient between pixels and information from the material properties library. The material properties library includes information regarding the mapping function of physical properties based upon voxel intensities. As a result of the execution of this part of the method, each structure or object embedded in the volume data is labeled as being of a particular type such as bone or soft tissue.

Another process, referred to as "Model Guidance", is optional and makes use of a reference model or atlas and can be used to guide the three-dimensional region of interest and hence more accurately label object regions.

After an object has been identified and labeled, the physical properties of the regions are assigned. In the preferred process, the only considerations with respect to physical properties are Young's Modulus and Mode of Rigidity. The object-shortest-distance is defined as the shortest distance between a voxel and the regions defining the object. It is determined for each voxel in the volume and the potential value is then determined based upon a polynomial combination of intensity, physical properties and object-shortest-distance.

In the preferred embodiment, the relationship determining the potential value for each voxel is as follows:

$$F(x, y, z, e, \gamma) = \frac{1}{2}(d_x^2 + d_x^2 + d_x^2) + f(e) + g(\gamma)$$

Where F is a function in the three-dimensional space, $d_i$ (i=x,y,z) is the distance in the ith direction between the point (x,y,z) and its given reference point A of the structure. The point A in many cases can be considered as the nearest point at a specified structure. Hence $d_i$ can be expressed as $$\vec{d}_x = P_x - A_x,$$
$$\vec{d}_y = P_y - A_y,$$
$$\vec{d}_z = P_z - A_z.$$

Function f(e) represents the mechanical properties of tissue point P. In general, the structure is nonlinear elastic or visco-elastic. But in the preferred embodiment, for simplicity, a linear model is employed to express the force-displacement or stress-strain relationship as:

$$\vec{\sigma} = \vec{D}\vec{\epsilon}$$

Where $\vec{\sigma}$ and $\vec{\epsilon}$ are stress and strain vectors, and $\vec{D}$ is a constitutive matrix. As linearity is required, the matrix $\vec{D}$ is constant for a given position. The equation is occasionally referred to as Hooke's generalized law. In a homogeneous case, only two elastic parameters, Young's modulus E and Poisson's ration v, are present. The mass density is also a component part in this function.

Function g represents the image intensity or the gray value of Point P. It is also related to the scanning mechanism, the scanning technique and other associated geometric information. Function g is used for image processing but in some cases, its value may also relate to mechanical properties, in particular, the mass density. In its simplest form, Function g equates to the image intensity.

The other features regarding the defined potential field can also be expressed as:

$$\vec{d} = \vec{d}_x + \vec{d}_y + \vec{d}_z,$$

$$d = \sqrt{(d_x^2 + d_x^2 + d_x^2)}$$

For computation, the proposed potential field can be quantised with respect to a grid space. For real-time calculation of object interaction, the potential components are pre-calculated and stored in a defined data structure. Hence, the computation of a given point P(x,y,z) will be implemented using a linear-cubic interpolation such as:

$$c = \sum_{i=1}^{8} N_i c_i$$

Where $c_i$ (i=1, 2, . . . , 8) is the component value at the ith node of the cubic. $N_i$ (i=1, 2, . . . , 8) is the ith shape function which can be expressed as:

$$N_i = \frac{(1 + \xi \xi_i)(1 + \eta \eta_i)(1 + \varsigma \varsigma_i)}{8}$$

Where $\xi$, $\eta$ and $\varsigma$ are coordinates in a parametric space.

After the potential values of all objects are obtained independently, a synthesis procedure is invoked to combine the results for each type of volume data considered.

The potential field model provides a basis for the establishment of force relationships such that realistic forces providing resistance to the passage of the tool can be fed back to the user by way of a haptic interface. The force vectors, which are stored as part of the potential field model, describe the direction and magnitude of force that should be conveyed as force feedback to a user for various points in the model. Since the potential field is established based on object properties and their spatial relationships, which is related to the "minimum distance to an object", such force feedback can provide realistic sensation with respect to an object's shape and "feel".

The same volume of force vectors can also be used to associate and generate audio signals based on some form of relationship between the object and the device or tool interacting with the object. For example, as the tool approaches an object, an audio signal could be generated to signal a potential collision. The sound upon collision and possible damage to the object could be readily adapted to the potential field. In addition, suitable audio messages could also be activated to alert the user to particular situations. The association of sounds with various points in the model provides the user with a collaborative sensation of the object at a particular point.

The use of a potential field model in the preferred embodiment provides additional information or dimension with respect to revealing the details of an anatomical structure. However, other information such as distances between objects and other parameters may also be presented on the visual display.

The development of a potential field model for a volume image and the derivation and association of visual, audible and haptic sensations for various points in the model as described above for the preferred embodiment, provides for the correct registration of the various types of sensory feedback as the user interacts with the objects identified from the volume image.

Haptic and Audio Interfaces

Voice Command and Control

Audio interfacing between the user and the system enables the implementation of a voice command and control application thereby allowing the user to more closely concentrate on the task at hand. In many medical procedures, audible commands are the primary method of communication between a surgeon and his assistants. Effectively, in the present invention, the computer system executing the model may become the assistant. The incorporation of a voice recognition facility would also enable a user to issue commands to the computer.

In reality, an assistant or patient in a medical procedure might respond to a surgeon's spoken communication. The incorporation of audio interfacing between the user and the computer provides for the simulation of this aspect of a medical procedure.

For example, the user may be navigating to a branch point which is of particular importance. In this instance, the system may prompt the user by way of synthesized speech warning that a special condition is about to occur. An audio interface is particularly useful for reducing the need for visual cues to a user which would have the effect of crowding the visual display device which will be providing the user with simulated visual representations of the various objects.

Similarly, a surgeon will generally speak to his assistant for assistance or information during a medical procedure. To accommodate this aspect, the system may include a microphone, the audio input preferably being digitised and matched with actions corresponding to the spoken commands. The voice commands could conceivably relate to requests for various tools. It is expected that tasks such as the fine adjustment of object manipulation would be performed by, or with, assistants since the user's hands are generally occupied.

Haptic Interfaces

The term "haptic interface" is used in this specification to refer to all forms of interface between a user and a system that involves the sense of touch. In the present invention, it is preferable to use a device referred to as an instrumented glove to provide a user with tactile responses. Other devices that may be used include force feedback probes and three-dimensional object manipulators. Whilst gloves have been used previously in virtual reality systems the usual form of an instrumented glove is an output device only. However, in the present invention, it is preferable to extend the function of a glove to enable it to receive input signals to include force feedback functionality.

Force Feedback Probe

Preferably, the system also includes a force feedback probe. Such a probe should have six degrees of freedom and provide a user with the ability to select a planar image and a point on the image with force feedback to restrict the hand movement within the area of interest. Additionally, it would be preferred that a force feedback probe include user activated switches or buttons to allow users to implement combinations of actions.

Figures 8A, 8B, 8C, 8D, 8E:
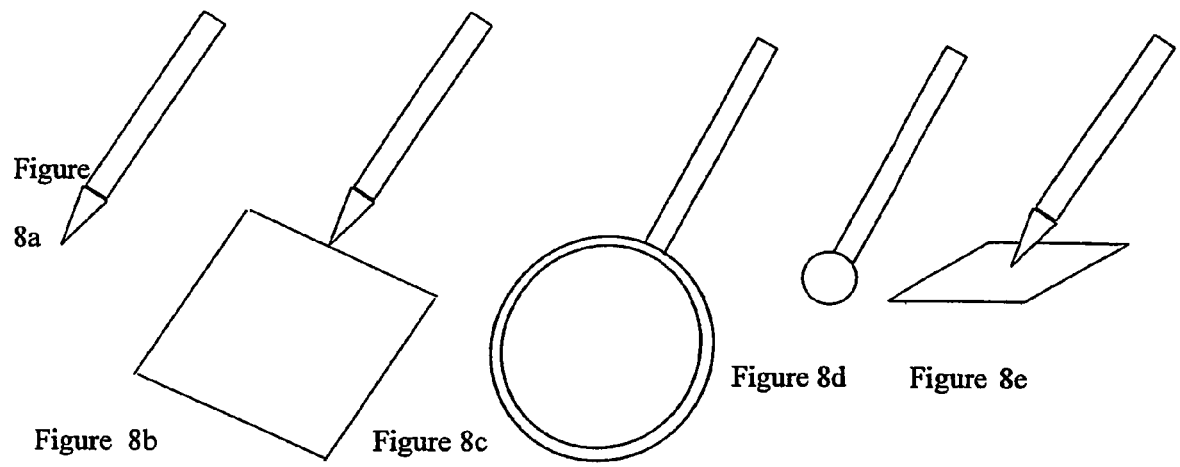
FIGS. 8a, 8b, 8c, 8d and 8e show various shapes and configurations that may be used for probes.

FIG. 8a details a typical force feedback probe that is considered suitable for the present invention and FIGS. 8b to 8e represent a range of alternative shapes and configurations for force feedback probes.

With an audio interface to the system capable of recognising spoken commands, switching between different visual representations of a force feedback probe could be effected in a manner similar to the practice in a surgical procedure when a surgeon instructs an assistant to provide him with a specific tool.

Object Manipulator

Figure 9:
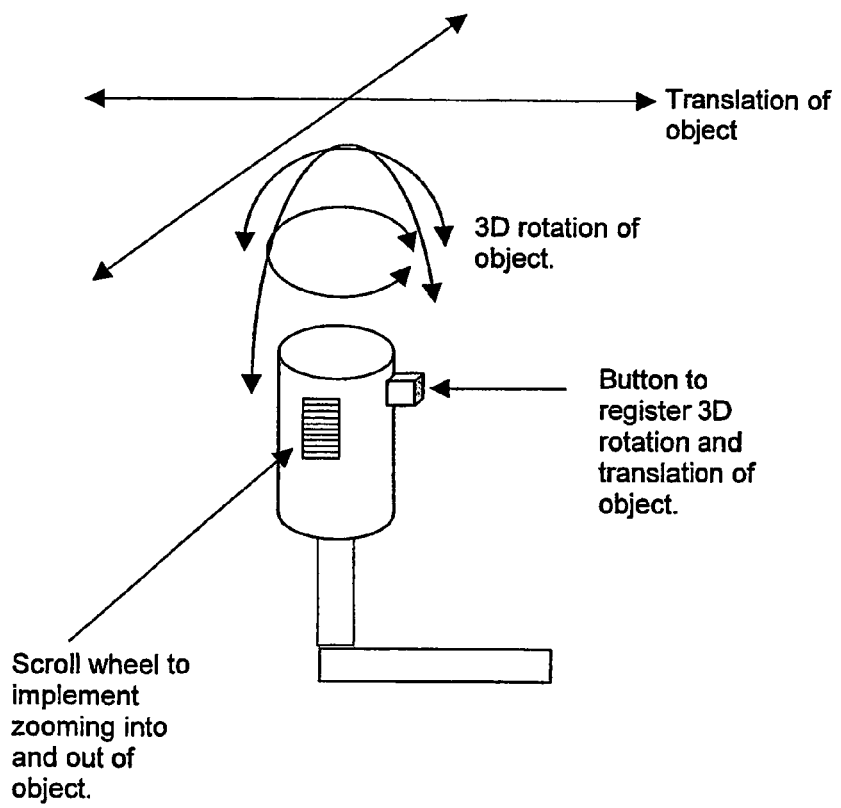
FIG. 9 illustrates a suggested implementation of an object manipulator for use in an IOEES.

FIG. 9 shows a preferred implementation of an object manipulator.

Preferably, an object manipulator is provided which can also make use force feedback signals generated by the system. To manipulate a virtual object, the user may depress a button or activate a switch to move the handle of the object manipulator. Preferably, the object manipulator is also provided with a scroll wheel at the side of the handle to implement scaling functions. It is expected that the object manipulator would be capable of receiving spoken commands from a user. It is also expected that the user would be able to fine tune object manipulation by spoken commands.

Force Feedback Glove

Figures 10A, 10B, 10C:
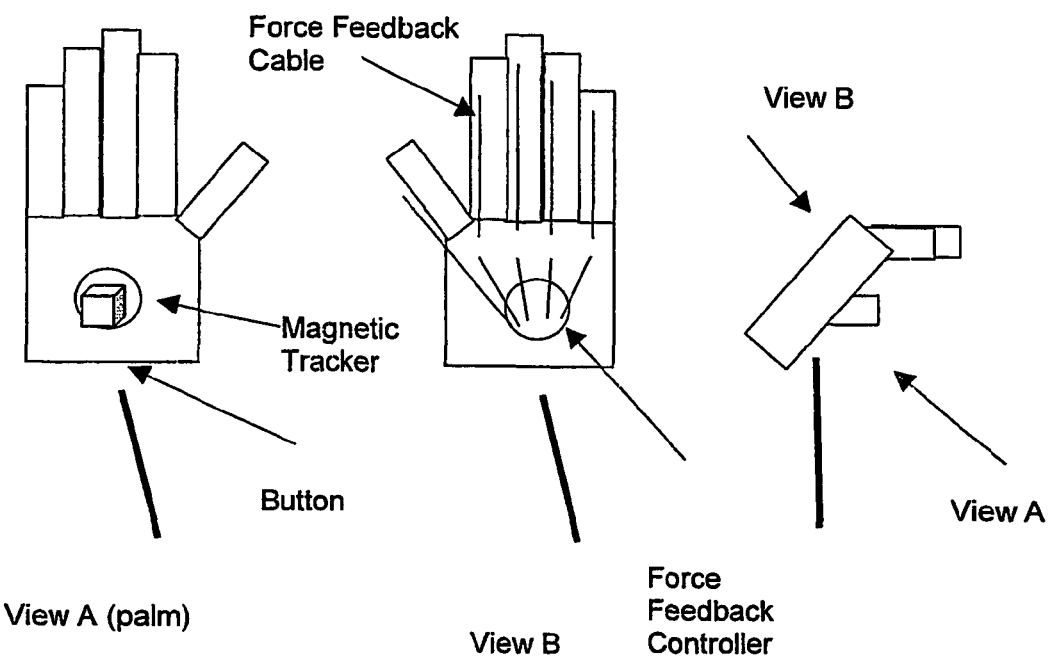
FIGS. 10a, 10b and 10c illustrate a suggested implementation of a force feedback glove for use in an IOEES.

An instrumented glove is considered to be a relatively natural way of providing a user with an input device comprising six degrees of freedom in a simulated or virtual environment. FIGS. 10a to 10c shows various views of the preferred configuration for a force feedback glove.

In the present invention, the glove preferably has both an input and an output capability. A magnetic tracker may be attached to the centre of the palm of the glove which may be considered by the system to be the rotational centre of the systems representation of the users hand. Preferably, the palm of the glove includes a switch or button, the activation of which is effected by closing the fingers of the users hand.

Additionally, it is preferable to include on the back of the glove relatively short, light weight cables interconnected with movable joints. The force feedback controller pulls or releases these cables to effect a sensation upon the wearer of the glove in accordance with the constraint required in light of the users interaction with simulated objects.

When using the glove, it is expected that all translation and rotation operations would be performed by the user's shoulder, elbow and wrist. Other than pressing the button on the palm, it is also expected that the smaller finger joints and muscle groups on the fingers would not utilized as users have very little control over movement of the small finger joints.

Since the glove requires rotation to be made with the wrist, the elbow and the shoulder, its range of rotation is limited and pressing the button on the palm of the glove is a method of indicating to the system that a limit has been reached. Whenever a limit is reached, the user needs to disengage the manipulated object. This may be effected by releasing the button under the fingers, which would restore the hand to a more comfortable posture, and then recommence the manipulation (by re-closing the fingers).

The Force feedback controller manages the force feedback cables to enable user to feel the gesture in the manipulation. Cables are joined using mechanical joints that have a micro motor attached. When the user is holding on to a solid object or a tool, the composite joints restraint the hand from moving beyond the shape of the object.

Preferably, the system includes a pair of force feedback gloves thereby enabling the use of both hands. To zoom in and out of the object, the user can bring the virtual object nearer and farther with the same glove.

The various tools that are represented in FIGS. 8a to 8e may now feel differently. As was the case for the force feedback probe, preferably, the interchange between various tools can be effected by way of spoken commands.

Figure 11:
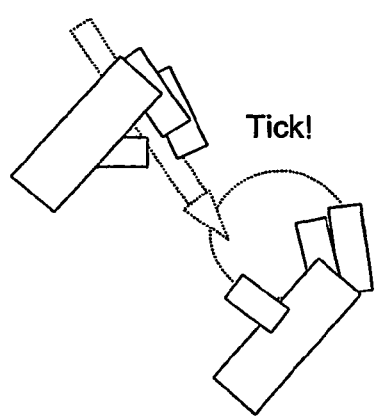
FIG. 11 illustrates a possible scenario involving the use of two force feedback gloves, a probe and a spherical object.

FIG. 11 illustrates an example of interaction between haptic, visual and audio interfaces. FIG. 11 illustrates the visual representation for a user wearing two instrumented gloves with one hand grasping a tool and the other hand grasping a spherical object. In the example of FIG. 11, the tool is brought into close proximity of the spherical object and a "tick" sound is played to the user to represent the tool and the object making contact in the simulated environment. The inclusion of audio capabilities in the system enhances the sense of reality that would otherwise be experienced by use of the haptic and visual interfaces alone.

Interaction Manager

Traditional approaches to performing tasks with virtual objects in three-dimensional space are generally considered cumbersome.

In particular, due to a lack of adequate depth perception, users generally can't confirm whether a desired target has been tagged correctly unless they alter their viewpoint or rotate the entire virtual space.

In addition, users generally find it difficult to select a point on a very small target. Inevitably, human users naturally experience hand tremor that contributes to this problem.

Preferably, a selection of devices, or tools, of different shapes and configurations is made available to users with the expectation that choices as to the types of devices will improve the ability of users to perform tasks in a virtual environment.

As human users naturally combine different modes to achieve physical and mental tasks, it is preferable that the system of the present invention incorporate the facilities to support those modes of interaction between a user and simulated, or virtual, objects.

It is preferable that the system provide the user with the capability to produce or devise tools with a shape or configuration defined by the user.

Architecture

Figure 12:
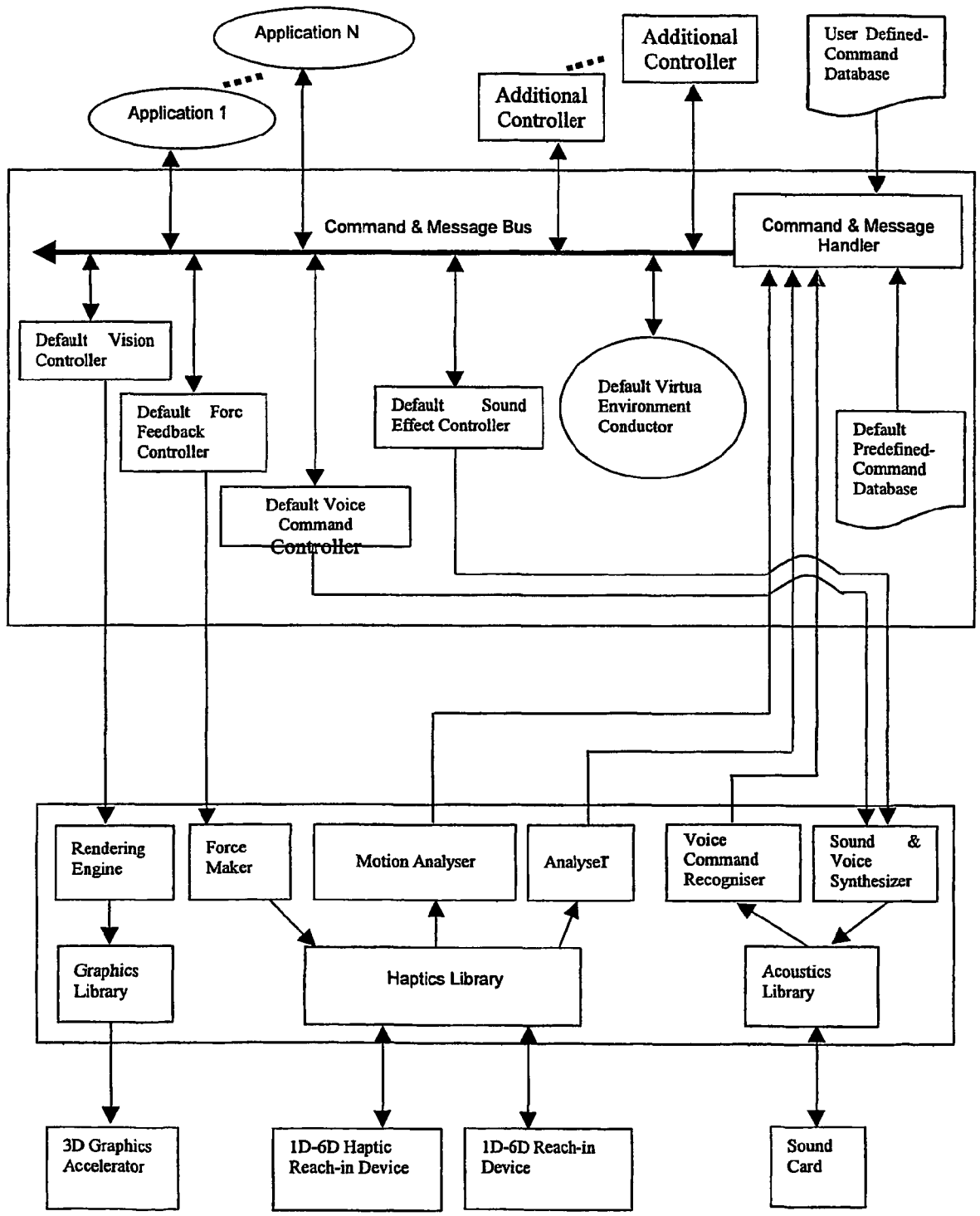
FIG. 12 illustrates a highly abstracted architectural representation of the Interaction Manager of the IOEES.

In the preferred embodiment, the Interaction Manager includes two sub-layers as detailed in FIG. 12. In this Figure, the largest outer rectangle represents the Interaction Manager, where upper sub-layer represents the Advanced Interaction Manager (AIM) and the lower sub-layer represents the Elementary Interaction Manager (EIM).

EIM provides general services and various kinds of information to support AIM to perform more complex functions. AIM provides outer applications with a uniform interface, including a Command & Message Bus (CMBus). In a preferred embodiment, user developed applications or additional controllers may be installed by listening and posting commands or messages via the bus as working in the event-driven mode.

Elementary Interaction Manager (EIM)

The EIM performs relatively basic tasks. It receives user input whilst also providing various devices with signals thus giving force feedback information to users.

In the preferred embodiment, existing libraries are used such as OpenGL and DirectX for the graphics libraries.

Several modules in the architecture function as multimedia engines. The Rendering Engine, Force Maker and Sound & Voice Synthesiser modules provide output signals to the user whereas the Motion Analyser, Gesture Analyser and Voice Command Recogniser receive information via respective input media and abstract them into a form that other components of the system can readily recognise and use.

In the preferred embodiment the Rendering Engine is able to supply primitive commands for rendering polygonal or model based virtual objects such as volume texture based virtual objects. Upon accepting a primitive command, the Rendering Engine will decompose it into several smaller commands that can be performed by invoking subroutines in the Graphics Library. The Force Maker and Sound & Voice Synthesizer modules operate on a similar basis.

In the preferred embodiment, the Gesture Analyser receives spatial data associated with several fingers in one hand, and determines corresponding gestures from them. No semantic information related to gesture is determined by the Gesture Analyser. The Voice Command Recogniser operates on a similar basis to the Gesture Analyser.

However, in the preferred embodiment, the Motion Analyser operates differently as compared with the Gesture Analyser and Voice Command Recogniser. The Motion Analyser only processes raw spatial data from reach-in devices, such as instrumented gloves, and transforms that data into representative movements in virtual space. In addition, the Motion Analyser filters the input data and analyses motion direction and speed.

Advanced Interaction Manager (AIM)

In the preferred embodiment the AIM comprises three components, these being a Command & Message Handler (CMH), a set of Controllers and a Default Virtual Environment Conductor.

Preferably, a message is a package including three fields, namely a data field, containing spatial data originated from the Motion Analyser, a sender field and a recipient field. It is also preferred that the command is also a package including a code field related to a service to be requested.

The Command & Message Handler can receive and analyse data supplied from the EIM and repackage them into messages or commands by using Default Predefined-Command Database or User Defined Command Database. The data from the Motion Analyser is converted into messages while those from the Gesture Analyser and Voice Command Recogniser are converted into commands.

Preferably, the Default Predefined-Command Database contains records defining a relation between gestures, or words, and commands. Moreover, an action as a gesture sequence, or a sentence can also be matched with a command. In the preferred embodiment the User Defined Command Database contains user defined commands representing the users favourite gestures or expressions. Preferably, user-defined relations have a higher priority as compared with predefined relations. The prioritisation of relations acts to resolve conflict when one gesture, or one expression, is related to two commands defined in the Default Predefined-Command Database and User Defined Command Database respectively.

Preferably, a default application is provided such as the Default Virtual Environment Conductor which constructs and maintains a virtual three-dimensional environment in which all other applications work. It also provides several basic and necessary routines such as managing three-dimensional control panels or opening data files of a default type or any similar utilities. In particular, it is able to supply several virtual tools such as a metal-detector, 3D-point-picker, 3D-scissors or various kinds of probes with different shapes and function for a user to study virtual objects. Furthermore, it should have privilege to control all controllers and applications.

User-Developed Application and Additional Controller

The architecture of the preferred embodiment conveniently provides for a user to characterise a virtual world by attaching their applications or their additional controllers into the CMbus. The user-developed application or controller has the same status as the default applications or controllers.

In this respect, the term "application" refers to a program that is to perform specific functions, whilst the term "controller" refers to a program that performs general functions.

For clarity, the following example is provided to illustrate how a user-developed virtual tool operates inside the Default Virtual Environment Conductor. Firstly, a user should determine what services it can supply and implement those services in an event-driven mode. Then, some specific codes should be added to a system configuration file for registering the controller. Thus, during the AIM initialisation, the Default Virtual Environment Conductor will open the system file and check if those registered controllers and applications are available, and then broadcast a message to allow them to initialise themselves. After initialisation, the new controller like others will be ready to serve any request.

Functionality

In the following sections, functions supported by Interaction Manager for the performance of commonly required tasks are described.

Reach a Position

Selecting a position of interest on an object can be a difficult task. Preferably, the Interaction Manager provides the following facilities to assist the user with the performance of this task.

In the preferred embodiment, the Motion Analyser includes a filter to reduce that component in the input signal due to human hand vibration. The filter may be calibrated to determine intrinsic parameters by assessing the hand vibration of a user. The filter is effectively a low-pass filter for signals in the three dimensions. However, in the present invention, the determination of the threshold frequency for the filter is important. In the preferred embodiment an intuitive procedure is implemented to determine the threshold frequency.

Firstly, assuming that a position calibration for the reach-in device has been conducted, the user is instructed to move the device along a displayed curve and hence forms a trail representing the users attempt to follow the curve. The actual trail of the device is displayed and recorded. The average difference between the curve and trail is computed and used to determine a first threshold frequency for the low pass filter. The filtered trail is compared with the curve and the average difference is determined. If the difference is not within an acceptable limit, the process is repeated to determine a new threshold frequency. The process continues until an acceptable average difference is reached.

An optional component, Target Finder, is also provided for any picking tool designed as a knowledge-based agent who can accept voice commands. A set of commands associated with Target Finder are also defined so that the Command & Message Handler can co-operate by correctly dispatching those commands recognised by Voice Command Recogniser to it via the CMBus.

Figure 13:
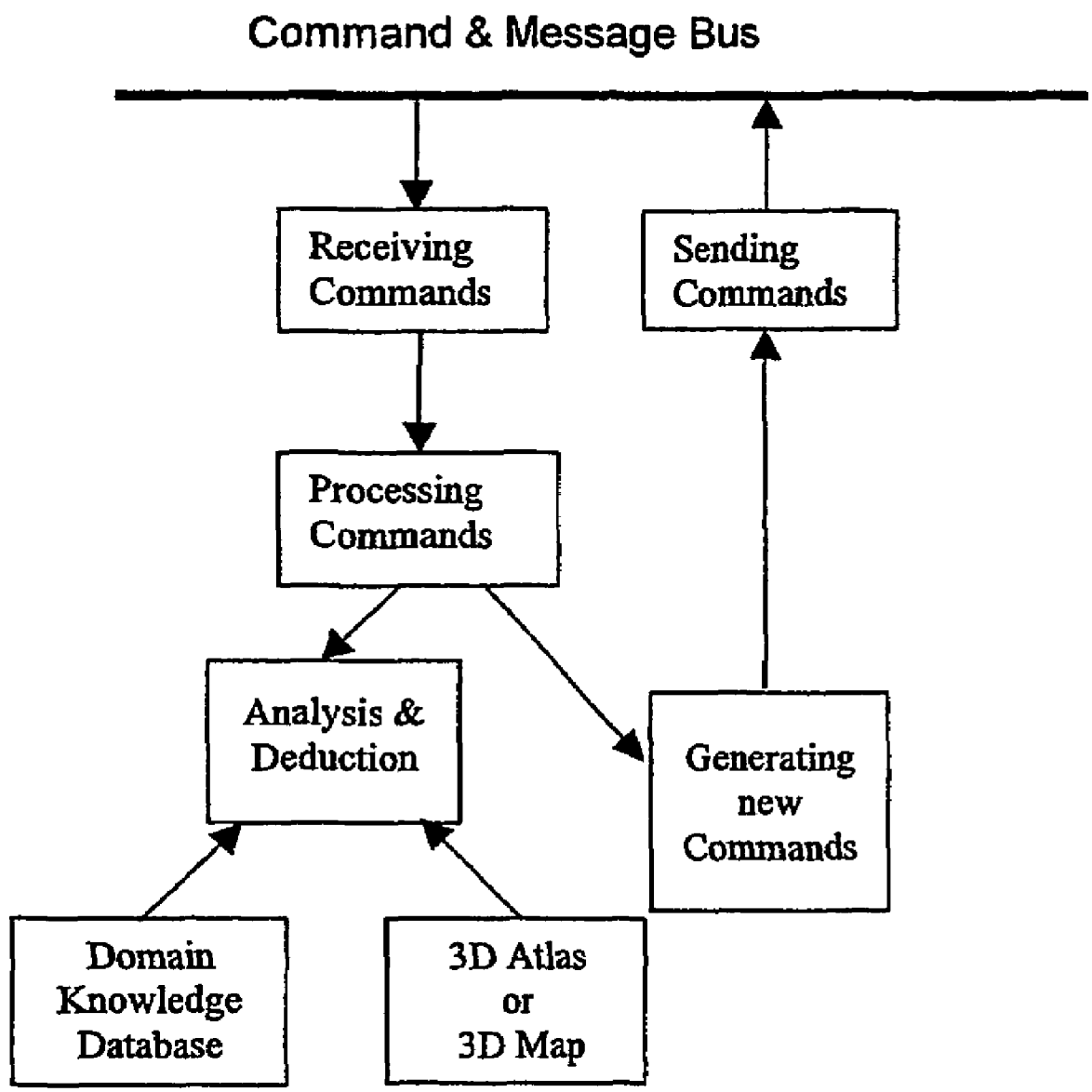
FIG. 13 shows a hierarchical representation of the functions involved in the transmission and reception of commands in the IOEES.

FIG. 13 shows a hierarchical representation of the functions involved in the transmission and reception of commands in the IOEES.

For simple commands, no analysis or deduction is generally needed.

However, for more complex commands, reference is required to a domain knowledge database and a three-dimensional model of the human body.

A three-dimensional snap function provides an efficient object picking technique in three-dimensional modelling. Nevertheless, when a three-dimensional reach-in device is used, the device calibration becomes a relatively difficult problem. Two methods are proposed to overcome this difficulty.

The first method involves adding an offset vector to positions conveyed from the reach-in device. For this method it is assumed that device calibration has been performed successfully before any snap operation (i.e. a transformation $T_{cal}$ acquired from the calibration will transform positions from device space into virtual space). The device space is defined as a space where the reach-in device moves and the virtual space is defined as a space where a virtual environment is imagined to be. If there is no snap operation, the relation between the two spaces is as $P_{vir}=T \cdot P_{dev}$, where $P_{vir}$ is in virtual space and $P_{dev}$ is in device space. When the snap operation is available, the relation is altered as $P_{vir}=T \cdot P_{dev}+V$, where V is so called offset vector.

The following description is a more detailed explanation for the method. For the purpose of the description we assume that an offset vector $V_i$ has been well defined in the $i^{th}$ snap operation. During the $(i+1)^{th}$ snap operation, when the reach-in device is moved onto a position $P_{dev}$, the virtual stylus is displayed as moving to the corresponding position $P_{vir}=T_{cal} \cdot P_{dev}+V_i$. Next, a position $P_{tag}$ nearby the position $P_{vir}$ is tagged by various snap rules, such as locating the nearest grid corner, to find nearest a point on a certain edge or surface. After that, a vector V' as $P_{tag}-P_{vir}$ is added to $V_i$. The result is the desired new offset vector $V_{i+1}$ as $V'+V_i$. So, $V_{i+1}$ will substitute $V_i$ in the transformation as $P_{vir}=T_{cal} \cdot P_{dev}+V_{i+1}$ until next snap operation. On the other side, the virtual stylus is displayed as jumping onto the position $P_{tag}$.

The second method can be used where a high level of realism is required. When a reach-in device is moved to a certain place, the user will observe the virtual stylus moving to the same place. The spatial information for the device from the haptic sense and vision are coincidental. Therefore, the former method, moving the virtual stylus without moving the reach-in device, can't be exploited here. The fact that it is not necessary that the virtual stylus' pinpoint exactly point to those positions that may be selected is helpful for us to implement the operation in such a situation. When the tagged position is determined as in the first method, the virtual pinpoint isn't moved onto it. Instead, the tagged point will blink or highlight to show that it has been selected. This also means that the pinpoint doesn't coincide with the actual selected point, and there is a small distance between them. Meanwhile, there is a force exerted on the device, which is well elaborated to facilitate the user to move the device to eliminate the distance. It is much like a force of attraction from the tagged position.

Force Computation Based on Potential Field

The Default Force Feedback uses a model based on potential field to generate resistance. It can be described as follows. If the scalar per every voxel is considered as a value of potential, the volume data set can be equivalent to a discrete potential field.

Furthermore, if the potential field is an electric field, a force should be exerted on any object with electric charge. The intensity of force is in proportion to the gradient of the potential field on the position where the object is located.

The force direction, along the gradient direction or its opposite direction, is dependent on which kind of electric charges (positive or negative) the object possesses. In the present situation, the potential value is also a factor contributing to the force. More generally, the force can be defined as a function of potential gradient and potential value. Thus, by computation of gradient vector on a position in volume data, a force vector can be completely determined and a force can be exerted on the haptic reach-in device. Such a force can be exploited to guide the user to explore and study three-dimensional virtual objects.

Figure 14:
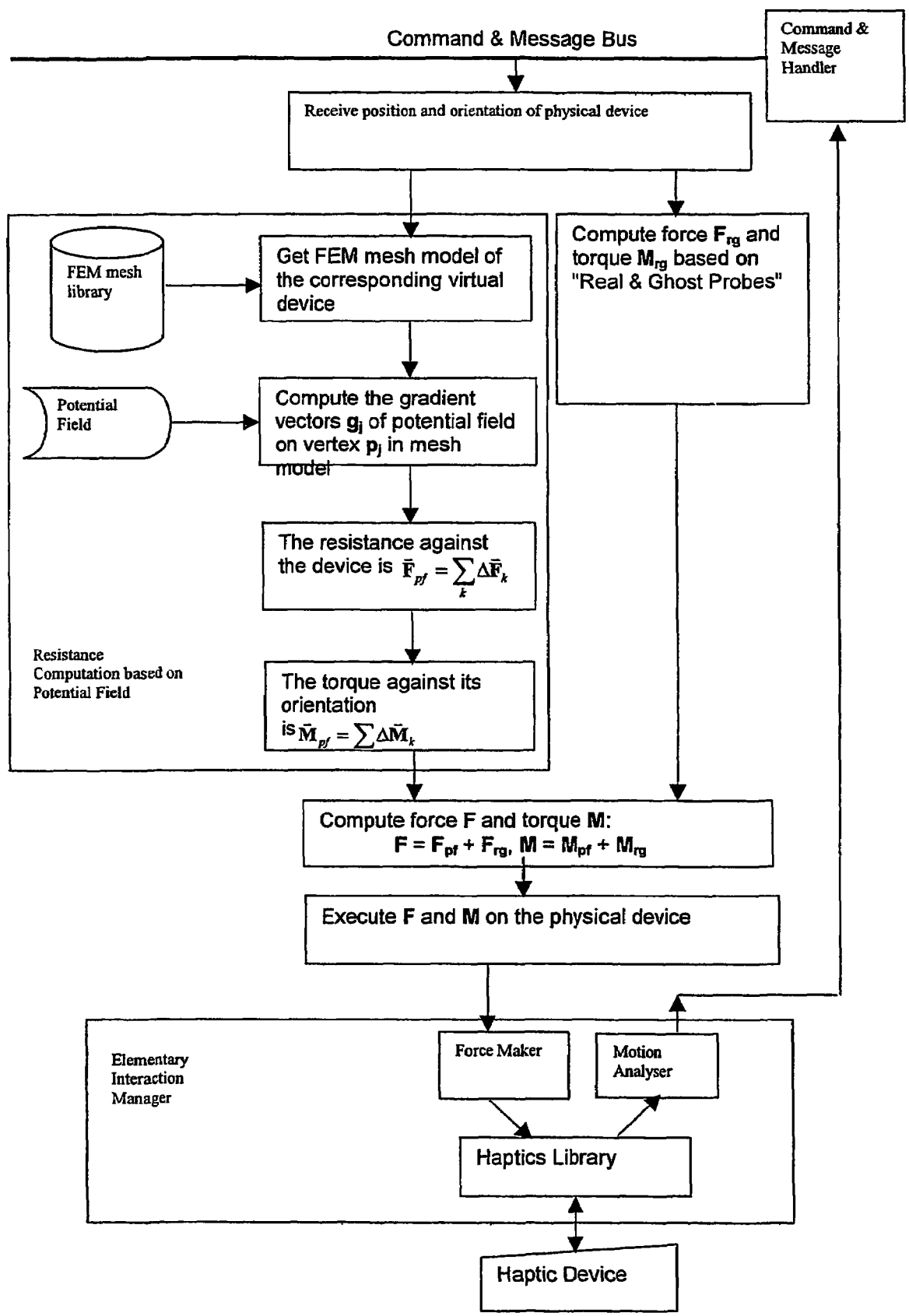
FIG. 14 shows the preferred process for the calculation of resistance based upon a potential field model for a force feedback controller.

With reference to FIG. 14, in the preferred embodiment, spatial information about a haptic device is measured by procedures in the Haptics Library and is then passed to the Motion Analyser and the Command & Message Handler. The spatial information is communicated to the Default Force Feedback Controller by way of the Command & Message Bus, together with other control information.

With respect to the "Resistance Computation based on Potential Field", a Finite Element Method (FEM) mesh model of the interacting tool is retrieved from an FEM mesh library. The FEM mesh model represents the shape and physical properties of the virtual tool being selected. The gradient vector of the potential field on each vertex in the model is determined from the following relationship:

$$\vec{g} = \nabla(\text{Kernel} * E_{potential})|_{\vec{p}},$$

In this relationship, "Kernel" refers to a three-dimensional filter function. A convolution operation between the Kernel function and the potential field $E_{potential}$ is performed as an anti-alias means in order to obtain a smooth result. Theoretically, the entire resistance $\vec{F}_{pf}$ is an integral of $d\vec{F}_{pf}$ which acts upon an infinite element in the virtual object. Since the Finite Element Method is employed, the above integration is simplified as a sum of contributions from each finite element. To reduce the computational requirement, only the surface mesh is considered in the preferred embodiment. Hence, each finite element geometrically corresponds to a mesh. The element is depicted by a set of vertices and a set of interpolation functions. The resistance encountered by a single element k is determined by the following relationship:

$$\Delta \vec{F}_k = \oiint \alpha_k(u,v)[\vec{n}_k(u,v) \cdot \vec{g}_k(u,v)] \vec{n}_k(u,v) du dv,$$

In this relationship, $\vec{n}_k(u,v)$ is a unit normal vector, $(u,v)$ are local parameters on the mesh in consideration, and $\alpha_k(u,v)$ is a physical property. Since the element k can be described by $$\vec{p}_k(u,v) = \sum_j \vec{p}_{k,j} \psi_j(u,v)$$

where $\psi_j(u,v)$ is the $j^{th}$ interpolation functions and $\vec{p}_{k,j}$ is $j^{th}$ vertex of the element k, $$\vec{n}_k(u,v) = \frac{\frac{\partial \vec{p}_k}{\partial u} \times \frac{\partial \vec{p}_k}{\partial v}}{\left\| \frac{\partial \vec{p}_k}{\partial u} \times \frac{\partial \vec{p}_k}{\partial v} \right\|} = \frac{\sum_{i,j} \frac{\partial \Psi_i}{\partial u} \frac{\partial \Psi_j}{\partial v} \vec{p}_{k,i} \times \vec{p}_{k,j}}{\left\| \sum_{i,j} \frac{\partial \Psi_i}{\partial u} \frac{\partial \Psi_j}{\partial v} \vec{p}_{k,i} \times \vec{p}_{k,j} \right\|}.$$

In practice, $\vec{n}_k(u,v)$ may be considered to be a constant vector, approximately $\vec{n}_k$, $\alpha_k(u,v)$ may also be considered to be constant $\alpha_k$ and $$\vec{g}_k(u,v) = \sum_j \vec{g}_{k,j} \phi_j(u,v)$$

where $\phi_j(u,v)$ is the $j^{th}$ interpolation function. Therefore, $$\Delta \vec{F}_k \approx \alpha_k \vec{n}_k \sum_j \vec{n}_k \cdot \vec{g}_{k,j} \oiint \phi_j(u,v) du dv = \alpha_k \vec{n}_k \sum_j \vec{n}_k \cdot g_{k,j} \gamma_f.$$

Furthermore, the total resistance force based on a potential field may be determined as:

$$\vec{F}_{pf} = \sum_k \Delta \vec{F}_k$$

The computation of the torque exerted on the virtual tool by the potential field is determined in a similar procedure as the force. The torque on element k is $$\Delta \vec{M}_k = \oiint \alpha_k(u,v)[\vec{n}_k(u,v) \cdot \vec{g}_k(u,v)][\vec{n}_k(u,v) \times \vec{r}_k(u,v)] du dv =$$

$$\alpha_k \sum_i (\vec{n}_k \times \vec{r}_{k,i}) \sum_j \eta_{i,j}(\vec{n}_k \cdot \vec{g}_{k,j})$$

where $\eta_{i,j} = \oiint \phi_i(u,v)\phi_j(u,v) du dv$, and $$\vec{r}_k(u,v) = \sum_i \vec{r}_{k,i} \phi_i(u,v)$$

refers to a vector from the point $\vec{p}_k(u,v)$ to $\vec{o}_k$, the center of mass of the element k, and $$\vec{r}_{k,i} = \vec{p}_{k,j} - \vec{o}_k.$$

The total resistant torque is determined as the sum of all the $\Delta \vec{M}_k$.

When resistance based on the potential field has been determined, other forces or torques, such as the constraint force from "Ghost & Real Probes" are also considered. After the total force F and the total torque M are determined, they are provided to the procedure "Force Maker", which invokes functions from Haptics Library to provide control signals to the haptic device to generate force and torque sensations.

Upon executing such a procedure, collisions or contact between the virtual tool and a volume object can be simulated. Since $\vec{g}$ will be greater on the boundary of a volume object according to the development of the potential field, greater force feedback will be sensed when approaching a boundary.

Using Audio Effect to Compensate Haptic Sense

We use the Default Sound Effect Controller to simulate the sound when a collision occurs. It is difficult to implement a haptic interface to let user sense the material property such as stiffness. Therefore, the playing audio effect can be used to compensate or enhance such a sense. In Default Sound Effect Controller, the shapes and the material properties for the virtual probe and virtual object are taken into account during the sound synthesis. Moreover, the approaching speed of the probe is another important factor that influences the sound of a collision.

The audio response provided by the potential field in the preferred embodiment may be described as follows.

The input generated from a potential field for the audio device is a scale value. Hence it can be well defined in relation to the distance to a target structure. For example, when a device moves away from a target structure, the volume of the audio output is determined to be proportional to the distance pre-calculated in the potential field. In many cases, people may also deploy different sounds to represent the distance. Direct commander distance broadcasting can also be employed for the awareness of a user. A specified coefficient should be used for the purpose such as:

Voice=vd

The coefficient v can be customized depending on the application.

Constraint Display Technique

In situations involving manipulation of a virtual object, a constraint to the reach-in device should be provided.

Since visual information strongly influences haptic perception, it is preferable for constraint rendering that a specific visual hint for a constraint be provided to accompany the use of a tool. A technique referred to as "Real & Ghost Probes" is employed in the Default Force Feedback Controller to implement such a visual cue.

Two probes are employed with the first probe (real probe) used for tracking and the other probe called (ghost probe) is displayed as a visual cue to suggest to the user what to do or where to go. However, the ghost probe usually is invisible, or in other words, it seems hidden within the real probe unless some application-based condition has failed and the respective constraint is to take effect. The Default Vision Controller will support Default Force Feedback Controller by performing the task as probe rendering while Default Force Feedback Controller takes control to determine the behaviour of the "ghost probe".

The following example is provided to detail how Default Force Feedback Controller makes such determination. When a user traces a certain virtual path with a reach-in device, some module will be able to continually give suggestions beforehand about which position and which direction the device should move. Then, the Default Force Feedback Controller will refer both these motion suggestions and the current spatial information of the device to determine whether the device diverges from the desired path. If it does, the Default Force Feedback Controller will render the ghost probe visible, move it to the suggested position, and then keep it there, while resistance is applied to the reach-in-device forcing it toward the ghost probe. From the user's perspective, it appears that the ghost probe splits from the real probe. Meanwhile, the user will feel less resistance encountered when moving the real probe toward the ghost probe. When the real probe is moved sufficiently close to the ghost probe, the ghost probe will re-merge with the real probe and disappear.

Virtual Tools

If a user handles an interactive device, the feeling is somewhat physical. If user wears a force feedback glove, such feeling would come from a simulated haptic rendering. Thus a virtual tool is independent of the physical device. Accordingly, the existence of a virtual tool only depends on whether user can sense it and has nothing to do with whether there is an actual device associated with it.

When only the force feedback glove is available, a user can "grasp" a virtual tool with a certain gesture while the respective haptic sense is fed back to the fingers and palm. Moreover, a user should be able to feel what has occurred from his fingers when the "grasped" tool touches or collides with other virtual objects. Since these tools are only in virtual space, they could be designed with any shape, configuration or characteristic.

For example, an ideal tool for exploring cells may include a pen-like shape with a thin long probe at one end. It's also expected to have some intelligence to help a user find targets of interest, as it's able to guide the user by means of voice, vision and/or haptic sense as well as accepting user spoken commands.

Naturally, the Target Finder, the respective techniques for three-dimensional snap and "Real & Ghost Probe" as discussed previously can be integrated to support such a virtual tool. From this perspective, the virtual tool can be regarded as a combination of a group of relative functions. Therefore, the concept provides a means for a user to recombine various features to a few convenient and powerful tools that he requires. Several default virtual tools are provided relating to contour detection, point tagging, shape modification and deformation. However, the system provides application developers the ability to define their own tools.

Extractor

In the preferred embodiment, a hierarchical contour model is used to represent an object extracted from volume image data. This model can be further converted into other geometric models such as a surface model or a mesh model. The Extractor includes three different modes of operation, namely Tracking Mode, Picking Key Points Mode and Guided Mode. In the following sections, the architecture and implementation of the Extractor will be discussed. The role of the Extractor in operational procedures is subsequently described.

Virtual Tools

Preferably, the Extractor includes two virtual tools referred to as the Cutting Plane Probe and the 3D-point-picker. In their implementation, several previously described techniques or functions such as 3D snap, Target Finder, "Ghost & Real Probe" and audio effects are all integrated to facilitate the interactive extraction.

The Cutting Plane probe is preferably has the shape of a magnifying glass, namely, a handle with a loop at one end. As a result, it is a tool with six degrees of freedom. Furthermore, the junction between the handle and the loop is preferably rotatable, thus enabling the loop to rotate when some virtual obstacle is encountered or it's attracted or driven by some force in the virtual environment. In the Extractor, the cutting plane technique has been exploited to control such rolling.

Moreover, the shape of the loop of the Cutting Plane probe can be deformed to suit the shape of any closed planar curve. Usually, the loop is a circle with a user definable radius.

The 3D-point-picker includes the Target Finder as a component and thus it is a virtual tool that responds to spoken commands. Furthermore, if some domain knowledge database is available, the picker will have more data from which to help the user. Certainly, it is preferred to integrate the constraint display and other facilities for 3D-point reaching.

Architecture and Implementation

The following paradigm describes the Extractor, where the Editor acts a co-worker receiving the Extractor's output and providing the Extractor with a respective parametric object model.

Except for the module R/S, which receives and sends messages, there are four modules within the Extractor. The Detector module forms the core and others are its peripheral parts. Each peripheral part is responsible for handling a respective working mode while the Detector processes those tasks as contour detection submitted from the peripheries.

Detector

The function of the Detector is to extract a contour on a cutting plane that is determined automatically. The cutting plane is determined from a known two-dimensional image processing technique, the details of which are not described in this specification.

The input includes a closed curve and a supporting plane. The steps of the algorithm are illustrated below where the cutting-plane technique mentioned before is used.
(a) Two specific parallel planes ($f_1$ and $f_2$) are determined according to the input which meet the following requirements.

They should transect the desired object.

They are to be parallel to the supporting plane and locate in each half spaces of the plane respectively. The distance between them should be relatively small as compared with the enclosing circle of the closed curve.
(b) The volume data is projected or sampled onto $f_1$ and $f_2$ respectively.
(c) In each plane, a 2D contour detection algorithm is implemented. Two central points ($b_1$ and $b_2$) are evaluated. A vector is then determined by connecting the two points while the dot product between the vector and the supporting plane's normal should be positive.
(d) A plane, referred to as the cutting-plane, can be determined with the vector and the middle point m between the two central points ($b_1$ and $b_2$). The cutting-plane is completely determinable by the two conditions such as the vector is its normal and the midpoint m is on it. The method from (a) to (d) for determining cutting-plane is so-called cutting-plane technique.
(e) The contour on the cutting-plane is extracted and corresponding parameters are yielded.

In the Detector module, the potential field model plays an important role as it acts to exert an attractive force on the deformable model which is placed on the cutting-plane to extract the desired contour.

Initially, a deformable model, which is geometrically a closed curve and includes various mechanical properties such as elasticity and rigidity, is arranged to enclose the object on the cross section. The forces calculated based upon the potential field modelling will attract the model to approach the boundary of the vascular object. Since the model is deformable, both the shape and location of the model will be influenced. When the force of attraction and the internal forces resulting from the propertied of elasticity and rigidity of the model are in equilibrium the model will not be deformed any further and at that stage it should correspond to the contour of the cross section of the vascular object.

Tracker

Tracker is to track user-controlled reach-in device, and is responsible for reconstructing a sweeping volume to catch user-desired object in volume data.

The Tracker records the spatial information of the CP-probe while incrementally constructing the sweeping volume comprising a series of closed curves and checks the validity of the volume when user's input isn't correct. Once it detects some invalid input, it will inform the Cutting Plane probe and the latter will let the Default Force Feedback Controller start up the corresponding constraint display as using "Ghost & Real Probe".

As for the constraint, the Tracker is only required to determine the next position to which the probe should move, and feed back the expected position and trend to the Cutting Plane probe. It is preferred to use a method referred to as "2-steps-forecast" to evaluate the expectation. At first step, the Tracker will exploit a curve to locally fit the trail of the moving loop's centre just around its latest position so as to estimate the position and trend. At the second step, the estimate information will be passed to the Detector with other required parameters, where a more accurate evaluation is effected and the result, a position where the loop's centre should move, is fed back to the Tracker. One the other side, the Tracker will pass those closed curves to the Detector continuously while accepting and rendering the extracted contours.

Explorer

The Explorer reconstructs a surface or a curve passing through several points given by a user while invoking the Detector to extract contours near the surface of the curve. The surface is expected as an approximate representation of the user-desired object's surface and the curve is as an approximate skeleton line of the object. In the following sections, a description of the Explorer working with skeleton line is provided.

The Explorer plays the role of a pathfinder after accepting a list of points, denoted as key-point-list (KPL). It will then attempt to explore the path the user desires. Namely, the Explorer must interpolate several points or a curve between every two adjacent KP's. A relatively simple method for this is linear or polynomial interpolation.

FIG. 14a shows how the Explorer works. The elements in KPL is noted as $q^0, q^1, q^2 \ldots q^n$. At the beginning, Explorer gets the first KP $q^0$ from KPL and lets $p_0=q^0$, where the $p_i$ (i=0 . . . m) stands for the interpolated points between $q^0$ and $q^1$. Tentatively, it has already acquired a radius $R_0$ and a vector $V_0$. The radius defines the maximum length for one step Explorer takes. The vector defines a direction, along which Explorer will step. Then, Explorer tries to predict the next position $p_1'$, which is almost along $V_0$ and is away from $p_0$ with distance less than $R_0$. Moreover, the tangent $V_1'$ of desired path on position $p_1'$ will be evaluated together with $R_1'$. The predicted triple ($p_1', V_1', R_1'$) from the Explorer then are passed into the Detector. The Detector will yield a triple ($p_1, V_1, R_1$) expected as a precise version to the input, where $p_1$ is on skeleton line and close to $p_1'$, $V_1$ is the tangent vector of skeleton line on $p_1$ and $R_1$ is the radius of the minimum enclosing-circle for the extracted contour around $p_1$. Then, the new triple returns to Explorer. At that time, Explorer treats $p_1$ as current position and ($p_1, V_1, R_1$) is ready for the next step adventure. In the same way, it will advance and output a list of triples ($p_i, V_i, R_i$) (i=0 . . . m) representing the skeleton line between $q^0$ and $q^1$ until reaching or being very close to $q^1$. Thereafter, each path between $q_i$ and $q_{i+1}$ (i=0 . . . n) can also be explored in the same way.

The method for initial triple ($p_0, V_0, R_0$) is given as below.

As we compute the precise triple, a predicted triple for $q^0$ should be calculated firstly. Then the predicted triple will be refined in Detector and the result is what we desire. The simple algorithm is shown below.

Letting $p_0'=q^0$, $V'=(q_1-q_0)/\|q_1-q_0\|$.

Using a region-growing algorithm to estimate the radius the enclosing circle for the contour around the $q^0$, where the radius is $R_0'$.

Calling Detector with $(p_0', V_0', R_0')$ as parameters. As usual, Detector will output a triple $(p_0, V_0, R_0)$.

In the FIG. 14b, $b_1$, $b_2$ and m are the auxiliary positions for Detector refining. Reader can refer to the section about Detector.

There are two alternatives to predict the next position. Here we assume that $p_i$ is available on the path between $q^0$ and $q^1$, and $p_{i+1}$ is the desired position.

(a) Let $p_{i+1}'=p_i+u \cdot R_i \cdot V_i$, when $\|q_1-p_i\|>u \cdot R_i$; If $\|q_1-p_i\|< u \cdot R_i$, let $p_{i+1}'=q_1$, where u is constant between 0 and 1. (shown in FIG. 3.6)

(b) Let $p_{i+1}'=p_i+u \cdot R_i \cdot (V_i+v)$, when $\|q_1-p_i\|>u \cdot R_i$. If $\|q_1-p_i\|<u \cdot R_i$, let $p_{i+1}'=q_1$, where u is constant between 0 and 1, and v is vector and is perpendicular to $V_i$. The length of v is less than $u \cdot R_i$. Since v is uncertain vector, $p_{i+1}'$ is uncertain subsequently. Then instead predicting one determinable position, Explorer generates a set of possible positions. In fact, Explorer chooses a v at random firstly and validates it to see if there is no surface across the path between $p_{i+1}'$ and $p_i$. If it is right position, then no further computation Explorer will take. Or else, it will choose another v randomly to try. Another validation is that $p_{i+1}'$ must satisfy the condition $\|p_{i+1}'-p_i\|<\epsilon$ when $\|p_{i+1}'-p_0\|>=\|q^1-p_0\|$ where $\epsilon$ is a relative small constant.

Discreter

Figure 15A:
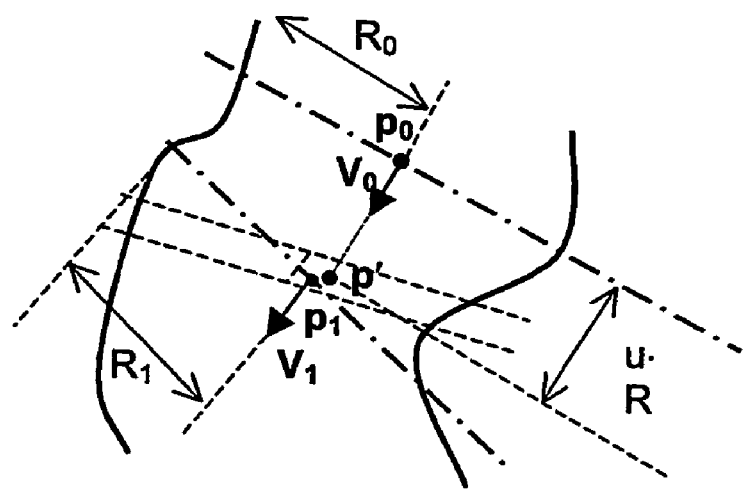
FIGS. 15a and 15b illustrate the operation of the Explorer attempting to develop a path along a list of points.
Figure 15B:
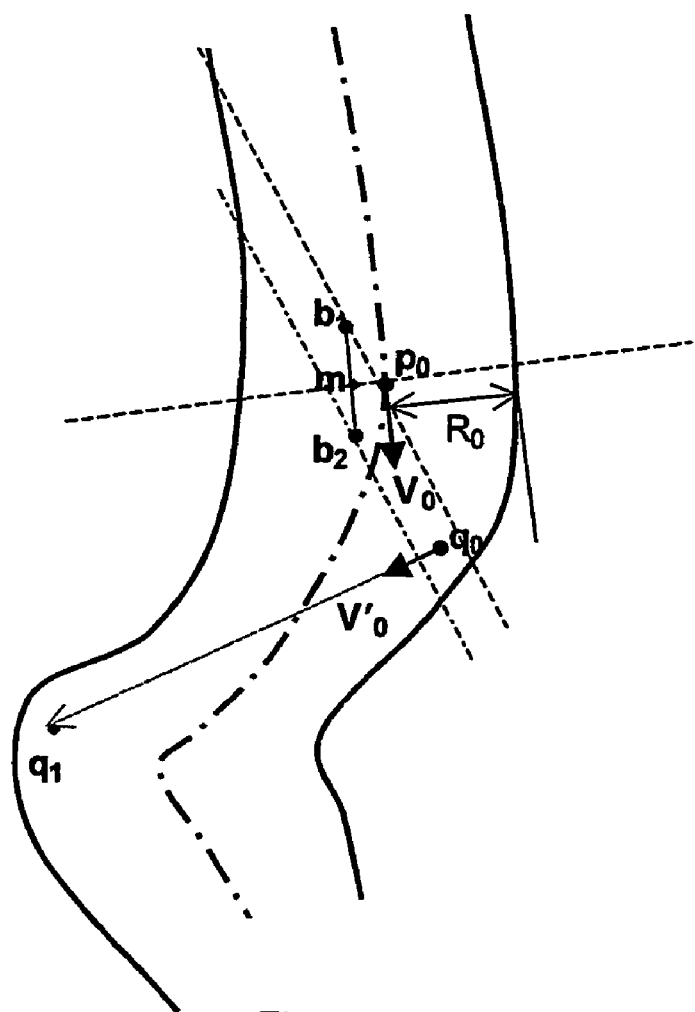

The Discreter plays the role of an advanced converter from parametric object model to discrete object model as the contour model. It is a bridge across the Extractor and Editor as observed in FIG. 15. It processes a model loader and a model converter internally. There are two methods to pass a parametric object to it. The first is by way of the Editor and the second is by importing existing models directly from an external file. The parametric object models are regarded as shape hints in the Discreter and can be exploited to aid in the extraction. If such a guide is available, it will assist the exploration of the desired object in volume data where the awkward problem of branch selection would be avoided.

Editor

The Extractor and Editor construct a loop for the incremental extraction. There are also several loops in Editor to provide various ways to modify the extracted result or shape hint. Thus, it can work firstly to feed the Extractor a shape hint to guide its extraction and secondly to work as a post-process to refine or trim objects determined by the Extractor.

The Editor consists of three parts, namely, a Modeler, a Selector and an Adjuster.

The Modeler constructs a parametric model based on a spline technique from a discrete model consisting of a series of contours. There are two alternatives as spline-interpolation and spline-fitting to accomplish the task. The Modeler works automatically and no interaction is required.

The Selector is responsible for the selection of several key points either automatic or interactively. The key points are referred to as those points scattered on important positions in the parametric model. In interactive mode, the user is also expected to pick those points that are around some lost detail in the parametric model, as it would greatly assist the refinement procedure.

The Adjuster manages the user's interaction and provides the user with the 3D-point-picker to control those selected key points. The picker can be used to access and control any key point with less effort as described in the section "Guided Mode". Thus, the user can alter the shape under a certain constraint by adjusting the key points.

Example Operational Procedure

In this section, the use of an Incremental Extraction and Edit System is described with reference to the extraction and editing of a three-dimensional object from volume data.

A three-dimensional volume is loaded and displayed along side with audio and haptic controls. The first step involves a preliminary extraction of a three-dimensional object from the volume data. The user then refines the extracted model with tools provided in the Editor module. The user could output or save the model when he or she is satisfied with the results. There are three modes in the extraction method. We will discuss how Extractor and Editor work to pursue their goal, aiding user to extract and edit object in volume data.

Extractor

The Extractor provides a user with three interaction modes such as Tracking Mode, Picking Key Points Mode and Guided Mode. Under each mode, the user is expected to give the Extractor a shape hint in a certain form of his desired object by use of one, or several, corresponding virtual tools. Thus, we put emphasis on the two questions as what form should be given and how to give the form.

Tracking Mode

This mode is intended to provide a user with the virtual tool CP-probe and expects the user to catch a desired object in volume data. The entire motion will be tracked by the Extractor which will then be exploited as a clue to benefit the extraction.

When the Extractor is working in Tracking Mode, the user can move the CP-probe freely before he selects a target object. At the same time, he can reshape the loop. Then, he is expected to drive the probe to sweep a volume where the target is almost fully contained. Meanwhile, a series of contours is displayed approximating the surface that is the nearest surface on the desired object to the sweeping volume. Therefore, if there is any cavity in the object, it cannot be extracted unless the user sweeps another volume that encloses it sufficiently closely. During the sweeping operation, a constraint will aid the user to perform the sweeping more accurately, as to warrant the volume almost enclosing the "target" that is perceived by the Tracker.

Picking Key Points Mode

In this mode, the user is expected to handle the 3D-point-picker and pick some key-points (KP) scattered on some shape hint of the desired object, such as skeleton or surface or even a volume.

If the KP's spread on a surface, the Explorer will reconstruct a polygonal surface from those KP's, and then slice it up with a stack of parallel planes. The intersection, as piecewise lines closed or unclosed on each section, will be transferred to the Detector. The Detector will attempt to extract those contours, each of which is the nearest to a certain piecewise line respectively.

If the KP's follow along a skeleton line (central line), the Explorer will attempt to trace the line. When dealing with a vessel like object, picking points along the central line is the most convenient. For an object with no cavity, its skeleton line is determinable and unique. To extract these objects with given KP's along their skeletons, the Explorer can do more for a user since these objects are simpler in topology.

After a user has finished picking points, the Explorer can operate automatically. Nevertheless, the degree of automation of the Explorer depends upon the quality of the KP's. In other words, if the specified KP's are unable to define a shape hint well, the Explorer pauses and prompts the user for further instruction. The instructions to a user may include questions on what to do and how to do it, or to suggest that the user input some parts of the shape hint again.

In this mode, the user need only pick some points on a surface or along a skeleton. Thus, the 3D-point-picker plays a very important role here since it can directly influence the efficiency and effectiveness of such an operation. The techniques for reaching a position are well established such as calibrating a filter to reduce spatial data noise, 3D-snap and intelligent Target Finder. Two examples for point approaching have already been described in the section entitled "Reach A Position".

Guided Mode

In this mode, a user inputs a curve or surface as a shape hint directly instead of a number of key points. Based on the b-spline modelling technique, it is relatively simple for a user to model a shape hint such as a skeleton or surface. More conveniently, a user can import some existing shape hint directly. These shape hints are referred to as guides.

At this stage, the Extractor will perform registration between a guide and the user-desired object. There could be different registration methods for different guides. When a curve is considered as a skeleton-guide, the registration method involves adjusting it to be contained in the object and being able to represent the skeleton well. When a surface is regarded as a surface-guide, the registration deforms it according to the shape of the desired object while a metric evaluates the difference between them. When an image-based model from a certain atlas is input as a guide, a seed-point-based registration will be executed. After registration, the Discreter module will sample that curve or surface, then provide the required parameters to the Detector similar to the Explorer. The difference is that the Discreter will encounter less difficulty under the guide when it tries to find the next position where the contour should be extracted. This is because there is no possibility for the Discreter to lose its way during such an exploration.

In modelling and registration, the 3D-point-picker can aid a user to perform various tasks. By utilising the constraint display technique and voice commands, the picker is expected to be a convenient tool for modelling such guides. For example, if a user intents to design a curve to represent the skeleton of an object. In this instance, the user is expected to input several control points to model a curve. The user can give some voice commands to control the curve shape such as altering spline bases geometric continuity and adjusting and jiggling control points. During the process of adjustment, the user will perceive haptic sensation. These haptic sensations are the result of the synthetic effect of multiple forces, such as elasticity of the curve and artificial repulsion based on potential field theory. The force originating from the constraint that the curve should be a skeleton line also adds to the haptic sensation. These sensations are useful for the user to work with three-dimensional modelling. It should be noted that the tool could also be exploited in any situation when editing is required.

In Guided Mode, the result may be more accurate and more efficient than that obtained from Picking Key Points Mode, however, a guide must be modelled or available beforehand. Another way of providing guides while avoiding or lessening the burden of modelling is to use either Tracking Mode or Picking Key Points Mode to generate a contour model. As an initial model, it is submitted to the Editor participating in some editing or refining loop. A parametric model of the same object will be generated by the Editor, and then it is regarded as a guide for the Extractor where the extraction in Guided Mode will be executed again. The Guided Mode enables users to perform a progressive extraction.

Editor

After the extraction phase, the user will have an option to start the Editor inside the Extractor or start it outside the Extractor where the user needs to acquire the contour model manually. A parametric model is constructed and rendered. The user then chooses the mode to select key points. If the automatic mode is chosen, several key points, which can keep the shape of the model, are selected and highlighted. They are now ready for the user's adjustment. If user selects the interactive mode, the user is required to tag on some points as the key points on the parametric model.

Once a key point has been selected, the user can then move it immediately. It is suggested that he should add some key points near some details that haven't been extracted or have been extracted incorrectly. Such types of key points are known as detail key points. After adjustment, a new parametric model that has interpolated the key points is reconstructed. If the user requires a refinement, he should initiate the Extractor with the new parametric model.

In the Guided Line Mode, the Extractor will establish a new contour model corresponding to the parametric model. Therefore, the lost or imperfect detail would be extracted if respective detail key points were given during the key point selection. As previously described, the process is a progressive refinement loop for extraction and edit. During the process, the user may obtain the result at any time.

Workflow

Figure 16:
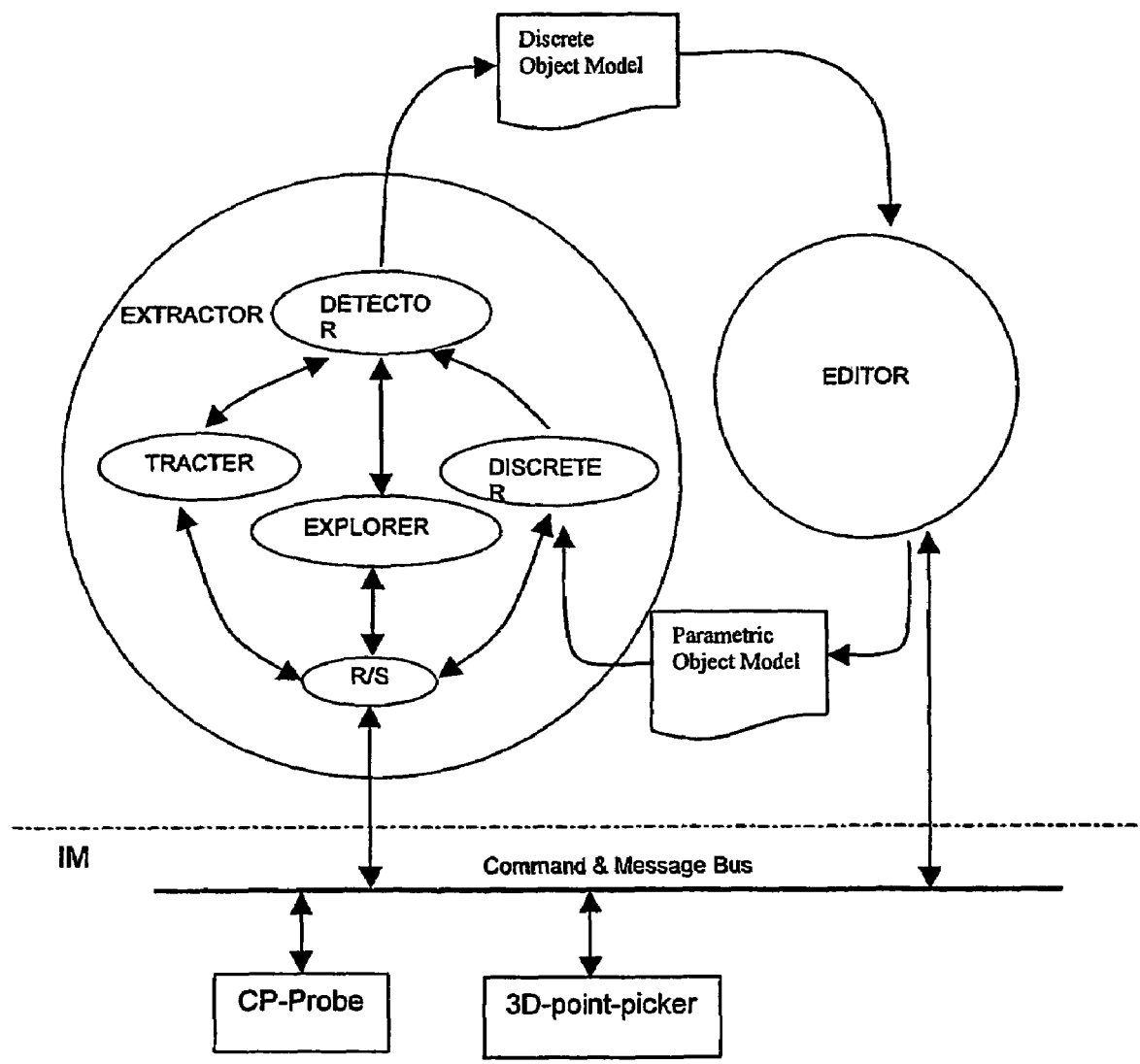
FIG. 16 illustrates the primary functions involved in the refinement of a continuous model of three-dimensional objects obtained from volume images and a first discrete model thereof.
Figure 17:
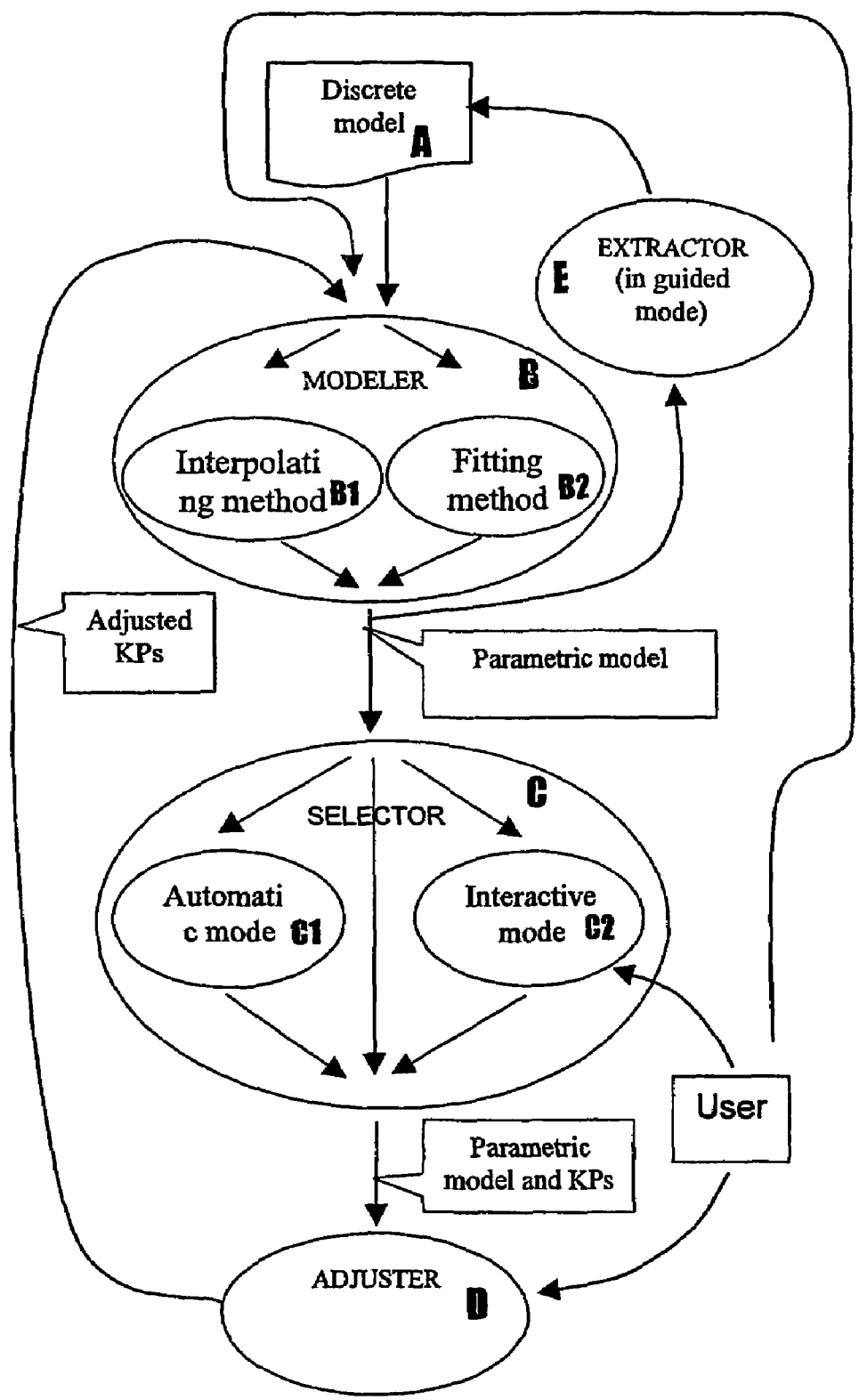
FIG. 17 illustrates the steps involved in an example operation of the IOEES in extracting and editing a three-dimensional object from volume data.

The basic workflow is outlined in FIG. 16. In this Figure, the Interaction Manager is omitted for convenience. The discrete model (contour model) is first passed to the Editor as input. This model is then flows to the Modeler (B). Afterwards, a parametric model, which is a result of either an interpolation or fitting method, is passed to the Selector (C). The Selector includes three modes such as automatic mode, interactive mode and simple mode, which can be chosen by the user. The selected key points will be conveyed to the Adjuster (D). After adjustment, those key points with new positions are returned to the Modeler. Then, processes B, C and D are executed again. Thus, the processes B, C and D form a loop, called as basic editing-loop.

Except for the first basic editing-loop, the user has a right to choose the simple mode to re-use KP's selected in the previous editing loop to avoid reselecting them again. In the simple mode, the Selector simply conveys the parametric model and those KP's selected in the previous editing loop to the Adjuster.

Besides the basic editing-loop, there is another loop consisting of the processes B, E, A and B. In this loop, the module E is the Extractor working in the Guided Mode. Since the Extractor performs better in Guided Mode, the loop may be considered as a progressive refinement. This loop is referred to as the refining-loop, and may invoke any combination between the refine-loop and basic editing-circle, such as the sequential process steps BCDBEAB, BEABCDB, BEABCDBCDB and so on, thus forming a complex editing-loop.

Finally, It will be appreciated that there may be other modifications and alterations made to the configurations described herein that are also within the scope of the present invention.

The invention claimed is:

1. A method of interacting with simulated three-dimensional objects, the method including the steps of
the identification of three-dimensional objects from volume images;
the association of physical properties with identified objects said properties including at least visual and haptic properties of the identified objects;
incorporating said identified objects and associated physical properties into a system including at least one visual interface device and at least one haptic interface device thus, enabling the system to simulate visual and haptic properties of the identified objects, or any part thereof, to a human user interacting with the simulated three-dimensional objects, or any part thereof, said interaction including the generation of signals by the system for transmission to the at least one visual interface device in accordance with the physical properties associated with the objects and the reception of signals from the least one haptic interface device in accordance with user requests; and
editing the representation of a simulated object in order to refine the representation of the simulated object derived from volume images.

2. A method according to claim 1 wherein during interaction between the human user and the simulated objects ancillary visual information is presented to the user.

3. A method according to claim 1 wherein the method includes the association of audible properties with identified objects, or parts thereof, and the system includes at least one audio interface device.

4. A method according to claim 3 wherein during interaction between the human user and the simulated objects ancillary audio information is presented to the user.

5. A method according to claim 1 wherein the at least one haptic interface device includes the facility to receive signals from the system said signals being in accordance with the associated haptic properties of the simulated objects, or any part thereof, that the user interacts with.

6. A method according to claim 1 wherein the interaction between the various interface devices of the system is coordinated such that the correct registration of physical properties with the identified objects is maintained for the various interfaces during interaction between the simulated objects and the human user.

7. A method according to claim 1 wherein the step of editing the representation of a simulated object includes the use of the at least one haptic and at least one visual interface device by the user.

8. A method according to claim 7 wherein the step of editing the representation of a simulated object includes the use of at least one audio interface device by the user.

9. A method according to claim 1 wherein a discrete model of identified objects is derived from volume images.

10. A method according to claim 9 wherein the method includes the step of editing the representation of a simulated object in order to refine the representation of the object derived from volume images, the method also including the application of an interpolative scheme to produce a continuous model from the discrete model derived from volume images.

11. A method according to claim 10 wherein the step of editing the representation of a simulated object includes the use of the at least one haptic and at least one visual interface device by the user.

12. A method according to claim 11 wherein the step of editing the representation of a simulated object includes the use of at least one audio interface device by the user.

13. A method according to claim 10 including an iterative process whereby an edited version of an object is compared with a previous discrete model of the object to determine the difference between the edited version and the previous discrete model of the object and whether the difference is within an acceptable limit, said edited version being converted into a discrete model for the purpose determining the difference with the previous discrete model.

14. A system for interacting with simulated three-dimensional objects, the system including
representations of three-dimensional objects identified from volume images, said representations including physical properties associated with each of the objects relating to at least visual and haptic properties thereof;
at least one visual interface device and at least one haptic interface device enabling a user to interact with a simulated three-dimensional object said interaction including the generation of signals by the system for transmission to the at least one visual interface device in accordance with the visual properties associated with the objects and the reception of signals from the at least one haptic interface device in accordance with user requests; and
a voice recognition facility capable of receiving and interpreting the spoken requests of a user thus enabling the user to issue commands to the system without necessitating the use of one or both of the user's hands.

15. A system according to claim 14 including the provision of ancillary visual information to a user.

16. A system according to claim 15 wherein the physical properties associated with each of the objects, or any part thereof, includes audible properties and the system also includes at least one audio interface device and the generation of signals by the system for transmission to the at least one audio interface device in accordance with the audio properties associated with the objects, or any part thereof.

17. A system according to claim 16 including the provision of ancillary audio information to a user.

18. A system according to claim 15 wherein the haptic interface device is capable of receiving signals from the system corresponding to the associated flaptic properties for any simulated object, or part thereof, said signals conveying a haptic sensation to the user as a result of interacting with the object.

19. A system according to claim 14 including the capability to co-ordinate the interaction between the various interface devices such that the correct registration of physical properties with the identified objects is maintained for the various system interfaces during interaction between the simulated objects and the human user.

20. A method of interacting with simulated three-dimensional objects, the method including the steps of
the identification of three-dimensional objects from volume images;
the development of a model to represent those objects;
the association of physical properties with identified objects in the developed model said properties including at least visual and haptic properties of the identified objects;

the association of physical properties with identified objects in the developed model said properties including at least visual and haptic properties of the identified objects; and incorporating said model and associated physical properties into a system including at least one visual interface device and at least one haptic interface device thus enabling the system to simulate visual and haptic properties of the identified objects or any part thereof, to a human user interacting with the simulated three-dimensional objects, or any part thereof, said interaction including the generation of signals by the system for transmission to the at least one visual interface device in accordance with the physical properties associated with the objects and the reception of signals from the at least one haptic interface device in accordance with user requests; and the interaction between the various interface devices of the system being coordinated such that the correct registration of physical properties with the developed model is maintained for the various interfaces during interaction between the simulated objects and the human user.

21. A method according to claim 20 wherein during interaction between the human user and the simulated objects, or any part thereof, ancillary visual information is presented to the user.

22. A method according to claim 20 wherein the method includes the association of audible properties with identified objects, or parts thereof, in the model, and the system includes at least one audio interface device.

23. A method according to claim 22 wherein during interaction between the human user and simulated objects, or parts thereof, ancillary audio information is presented to the user.

24. A method according to claim 20 wherein the at least one haptic interface device includes the facility to receive signals from the system said signals being in accordance with the associated haptic properties of the simulated objects, or any part thereof, that the user interacts with.

25. A method according to any claim 20 wherein the method includes the step of editing the model of a simulated object in order to refine the model of the simulated object derived from volume images.

26. A method according to claim 25 wherein the step of editing the model of a simulated object includes the use of the at least one haptic and at least one visual interface device by the user.

27. A method according to claim 26 wherein the step of editing the model of a simulated object includes the use of the at least one audio interface device by the user.

28. A method according to any claim 20 wherein the model of identified objects derived from volume images is a discrete model.

29. A method according to claim 28 wherein the method includes the step of editing the model of a simulated object in order to refine the model of the simulated object derived from the volume images, the method also including the application of an interpolative scheme to produce a continuous model from the discrete model derived from volume images.

30. A method according to claim 29 wherein the step of editing the representation of a simulated object includes the use of the at least one haptic and at least one visual interface device by the user.

31. A method according to claim 29 wherein the step of editing the representation of a simulated object includes the use of at least one audio interface device by the user.

32. A method according to claim 29 including an iterative process whereby an edited version of a model is compared with a previous discrete model of the object to determine the difference between the edited version and the previous discrete model of the object and whether the difference is within an acceptable limit, said edited version being converted into a discrete model for the purpose determining the difference with the previous discrete model.

33. A method according to claim 20 wherein the model is a potential field model representation of identified objects.

34. A method according to claim 33 wherein the potential field model includes a physically oriented data structure for the representation of objects derived from volume images and the association of physical properties therewith.

35. A system for interacting with simulated three dimensional objects, the system including
a model of three-dimensional objects identified from volume images, said model including physical properties associated with each of the objects relating to at least visual and haptic properties, thereof;
at least one visual and haptic interface device enabling a user to interact with a simulated three-dimensional object said interaction including the generation of signals by the system for transmission to at least the at least one visual interface device in accordance with the visual properties associated with the objects and the reception of signals from the at least one haptic interface device in accordance with user requests; and
a voice recognition facility capable of receiving and interpreting the spoken requests of a user thus enabling the user to issue commands to the system without necessitating the use of one or both of the user's hands.

36. A system according to claim 35 including the provision of ancillary visual information to a user.

37. A system according to claim 36 wherein the physical properties associated with each of the objects, or any part thereof, includes audible properties and the system also includes at least one audio interface device and the generation of signals by the system for transmission to the at least one audio interface device in accordance with the audio properties associated with the objects, or any part thereof.

38. A system according to claim 37 including the provision of ancillary audio information to a user.

39. A system according to claim 38 wherein the potential field model includes a physically oriented data structure for the representation of objects derived from volume images and the association of physical properties therewith.

40. A system according to claim 35 wherein the haptic interface device is capable of receiving signals from the system corresponding to the associated haptic properties for any simulated object, or part thereof, said signals conveying a haptic sensation to the user as a result of interacting with the object.

41. A system according to any claim 35 including the capability to co-ordinate the interaction between the various interface devices such that the correct registration of physical properties with the model is maintained for the various interfaces during interaction between the simulated objects and the human user.

42. A system according to claim 35 wherein the model is a potential field model representation of identified objects.

43. A system according to claim 35 wherein the potential field is defined as a volume of force vectors that have a tendency of moving from values of high to low potential.

44. A system according to claim 35 wherein the potential field model provides the basis for the establishment of force relationships and audio signal association for the generation of sensory feedback.

* * * * *